United States Patent
Galor Gluskin et al.

(10) Patent No.: US 10,044,926 B2
(45) Date of Patent: Aug. 7, 2018

(54) OPTIMIZED PHASE DETECTION AUTOFOCUS (PDAF) PROCESSING

(71) Applicant: QUALCOMM Incorporated, San Diego, CA (US)

(72) Inventors: Micha Galor Gluskin, San Diego, CA (US); Sanket Krishnamurthy Sagar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/654,433

(22) Filed: Jul. 19, 2017

(65) Prior Publication Data

US 2018/0131862 A1 May 10, 2018

Related U.S. Application Data

(60) Provisional application No. 62/418,056, filed on Nov. 4, 2016.

(51) Int. Cl.
*G03B 13/00* (2006.01)
*H04N 5/232* (2006.01)
*G06T 7/11* (2017.01)

(52) U.S. Cl.
CPC ........... *H04N 5/23212* (2013.01); *G06T 7/11* (2017.01)

(58) Field of Classification Search
CPC .......... G02B 7/34; G02B 7/343; G02B 7/346; G02B 7/28; G02B 7/09; G02B 7/36; H04N 5/23212; H04N 5/3696; G03B 13/32; G03B 13/36; G01C 3/00
USPC ....................................................... 348/350
See application file for complete search history.

(56) References Cited

U.S. PATENT DOCUMENTS

| 9,420,164 B1 | 8/2016 | Galor et al. |
| 2006/0008265 A1* | 1/2006 | Ito .......................... G02B 7/102 396/125 |
| 2012/0300116 A1* | 11/2012 | Nakamoto ......... H04N 5/23212 348/349 |

(Continued)

FOREIGN PATENT DOCUMENTS

JP 2015108711 A 6/2015

OTHER PUBLICATIONS

International Search Report and Written Opinion—PCT/US2017/048361—ISA/EPO—dated Nov. 22, 2017.

*Primary Examiner* — Chia-Wei A Chen
(74) *Attorney, Agent, or Firm* — Paradice and Li LLP

(57) ABSTRACT

Systems, methods, and devices for optimizing phase detection autofocus (PDAF) processing are provided. One aspect provides an apparatus comprising: an image sensor configured to capture image data of a scene; a buffer; and a processor. The processor may be configured to store the image data in the buffer as a current frame and divide the current frame into a plurality of windows each corresponding to a different spatial region of the scene. The processor may be further configured to identify a central portion of the current frame comprising a subset of the plurality of windows. The processor may be further configured to determine a depth value of the central portion based on performing PDAF on the subset of the plurality of windows and determine a confidence value for the central portion based on the depth value and image data corresponding to the subset of the plurality of windows.

27 Claims, 18 Drawing Sheets

(56) References Cited

U.S. PATENT DOCUMENTS

| | | | |
|---|---|---|---|
| 2014/0016021 A1 | 1/2014 | Uchida | |
| 2015/0002838 A1* | 1/2015 | Fukuda | G02B 7/346 356/123 |
| 2015/0124129 A1* | 5/2015 | Aoki | G03B 13/36 348/280 |
| 2015/0146994 A1* | 5/2015 | Arnison | G06T 7/571 382/254 |
| 2015/0187083 A1 | 7/2015 | Yoon et al. | |
| 2015/0244929 A1 | 8/2015 | Lee et al. | |
| 2015/0365584 A1* | 12/2015 | Samurov | G03B 13/36 348/349 |
| 2016/0021295 A1* | 1/2016 | Krestyannikov | H04N 5/23212 348/345 |
| 2016/0042526 A1* | 2/2016 | Lee | H04N 5/23216 348/351 |
| 2016/0248967 A1* | 8/2016 | Sasaki | H04N 5/23212 |
| 2016/0316136 A1* | 10/2016 | Tanaka | G02B 7/285 |
| 2016/0327771 A1* | 11/2016 | Inoue | G02B 7/34 |
| 2016/0344962 A1 | 11/2016 | Hirai | |
| 2017/0017136 A1* | 1/2017 | Kao | G03B 13/20 |
| 2017/0244889 A1* | 8/2017 | Sakurabu | H04N 5/23212 |
| 2017/0265725 A1* | 9/2017 | Ichikawa | A61B 1/00188 |
| 2017/0289439 A1* | 10/2017 | Miyazawa | G03B 13/36 |
| 2017/0318217 A1* | 11/2017 | Takao | H04N 5/3572 |
| 2018/0114327 A1* | 4/2018 | Ikemoto | G06T 7/55 |

* cited by examiner

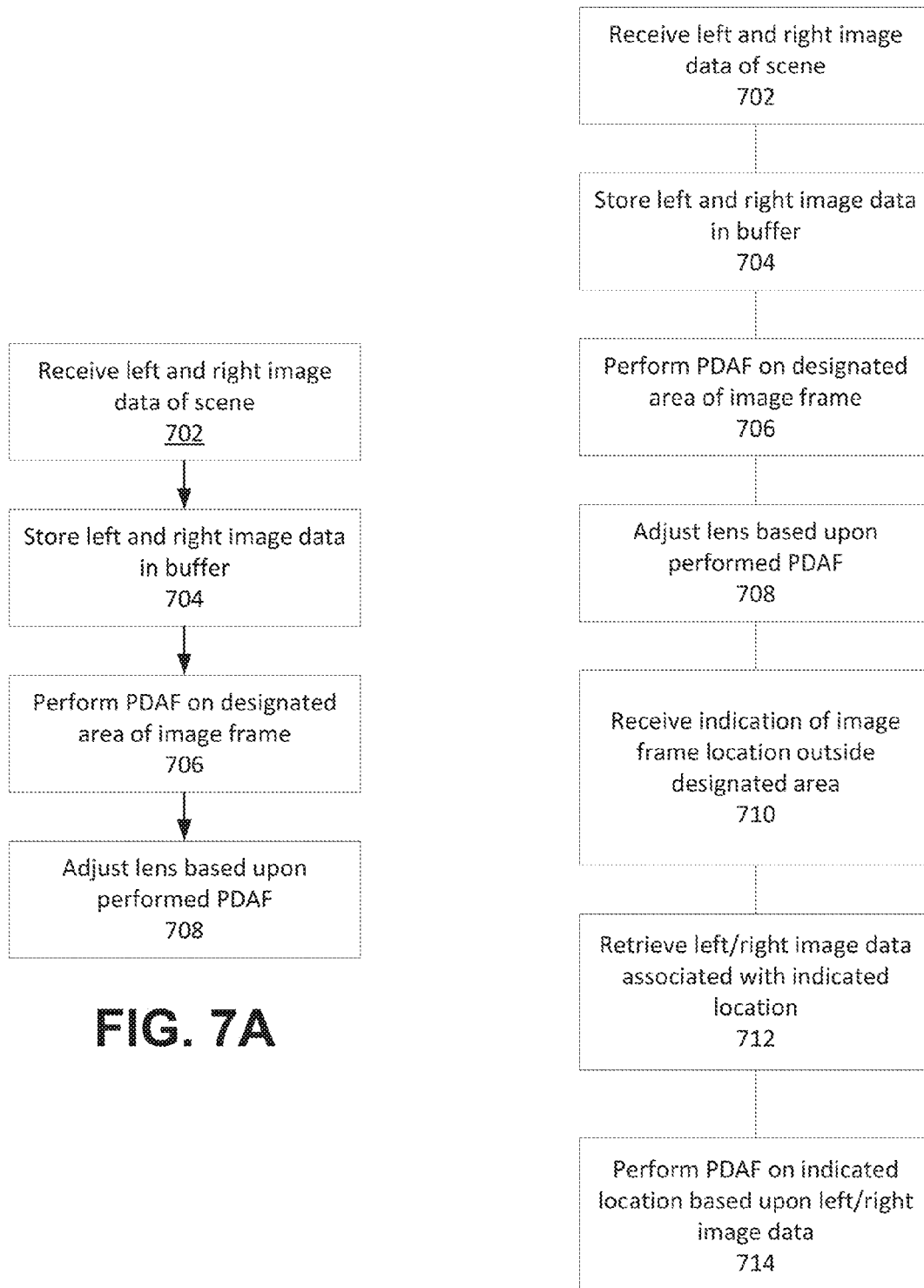

OPTIMIZED PHASE DETECTION AUTOFOCUS (PDAF) PROCESSING

CROSS REFERENCE TO RELATED APPLICATION(S)

This application claims the benefit of U.S. Provisional Application No. 62/418,056, filed Nov. 4, 2016, which is hereby incorporated by reference under 37 CFR 1.57.

TECHNICAL FIELD

The systems and methods disclosed herein are directed to phase detection autofocus.

BACKGROUND

Some image capture devices use phase difference detection sensors (which may also be referred to as "pixels") to perform autofocus. On-sensor phase difference detection works by interspersing phase difference detection pixels between imaging pixels, typically arranged in repeating sparse patterns of left and right pixels. The system detects phase differences between signals generated by different phase difference detection pixels, for example between a left pixel and a nearby right pixel. The detected phase differences can be used to perform autofocus. In general, phase detection autofocus operates faster than contrast-based autofocus.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of this invention provide advantages that include improved communications between access points and stations in a wireless network. Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present application provides an apparatus comprising an image sensor configured to capture image data of a scene. The apparatus further comprises a memory comprising a buffer. The apparatus further comprises at least one processor coupled to the image sensor and the memory. The at least one processor is configured to receive and store the image data captured by the image sensor in the buffer as a current frame of the scene. The at least one processor is further configured to divide the current frame of the scene into a plurality of windows, each of the plurality of windows corresponding to a different spatial region of the scene. The at least one processor is further configured to identify a central portion of the current frame, the central portion comprising a subset of the plurality of windows. The at least one processor is further configured to determine a first depth value of the central portion based on performing phase detection autofocus (PDAF) on the subset of the plurality of windows. The at least one processor is further configured to determine a confidence value for the central portion based on the first depth value and image data corresponding to the subset of the plurality of windows a method of wireless communication.

Another aspect of the present application provides a method comprising capturing, at an image sensor, image data of a scene. The method further comprises receiving and storing the image data, at a buffer, as a current frame of the scene. The method further comprises dividing the current frame of the scene into a plurality of windows, each of the plurality of windows corresponding to a different spatial region of the scene. The method further comprises identifying a central portion of the current frame, the central portion comprising a subset of the plurality of windows. The method further comprises determining a first depth value of the central portion based on performing phase detection autofocus (PDAF) on the subset of the plurality of windows. The method further comprises determining a confidence value for the central portion based on the first depth value and image data corresponding to the subset of the plurality of windows an apparatus for wireless communication over a transmission channel.

Another aspect of the present application provides an apparatus comprising means for capturing image data of a scene. The apparatus further comprises means for receiving and storing the image data as a current frame of the scene. The apparatus further comprises means for dividing the current frame of the scene into a plurality of windows, each of the plurality of windows corresponding to a different spatial region of the scene. The apparatus further comprises means for identifying a central portion of the current frame, the central portion comprising a subset of the plurality of windows. The apparatus further comprises means for determining a first depth value of the central portion based on performing phase detection autofocus (PDAF) on the subset of the plurality of windows. The apparatus further comprises and means for determining a confidence value for the central portion based on the first depth value and image data corresponding to the subset of the plurality of windows.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIGS. 7A and 7B illustrate flowcharts of processes for an image capture device to perform PDAF on an image frame, in accordance with some embodiments.

DETAILED DESCRIPTION

Figure 1A:
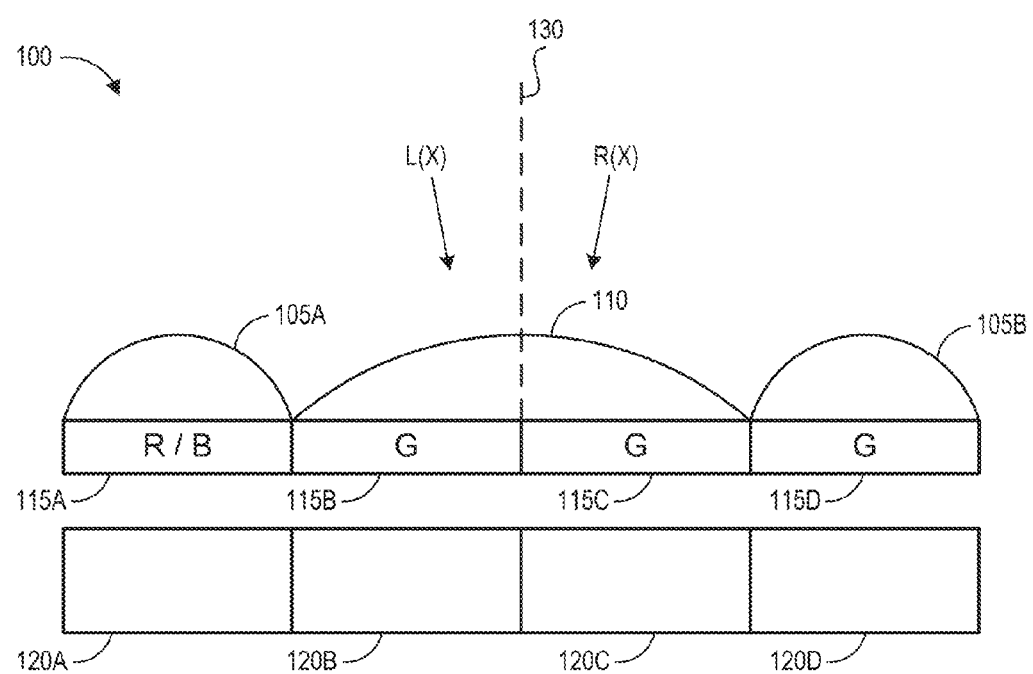
FIG. 1A depicts a schematic view of an example multi-diode microlens as described herein.

Various aspects of the novel systems, apparatuses, methods, and mediums are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the embodiments described herein. Details are set forth in the following description for purpose of explanation. It should be appreciated that one of ordinary skill in the art would realize that the embodiments may be practiced without the use of these specific details. In other instances, well known structures and processes are not elaborated in order not to obscure the description of the disclosed embodiments with unnecessary details. Thus, the present application is not intended to be limited by the implementations shown, but is to be accorded with the widest scope consistent with the principles and features disclosed herein.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

Phase Detection Auto Focus (PDAF) methods are based on measuring the horizontal offset, or phase, between two images that were generated with different asymmetric optical apertures. The magnitude and sign of the calculated phase may be correlated with an amount of defocus, which can be used to estimate the lens displacement needed for optimal focus.

In some embodiments, in Single Lens Reflex cameras (SLR), an autofocus (AF) system for performing PDAF typically includes a separate optical path leading to a dedicated PDAF sensor. In other embodiments, such as on many camera phones, pixel level design may create an effective aperture for left and right pixels.

Figure 12A:
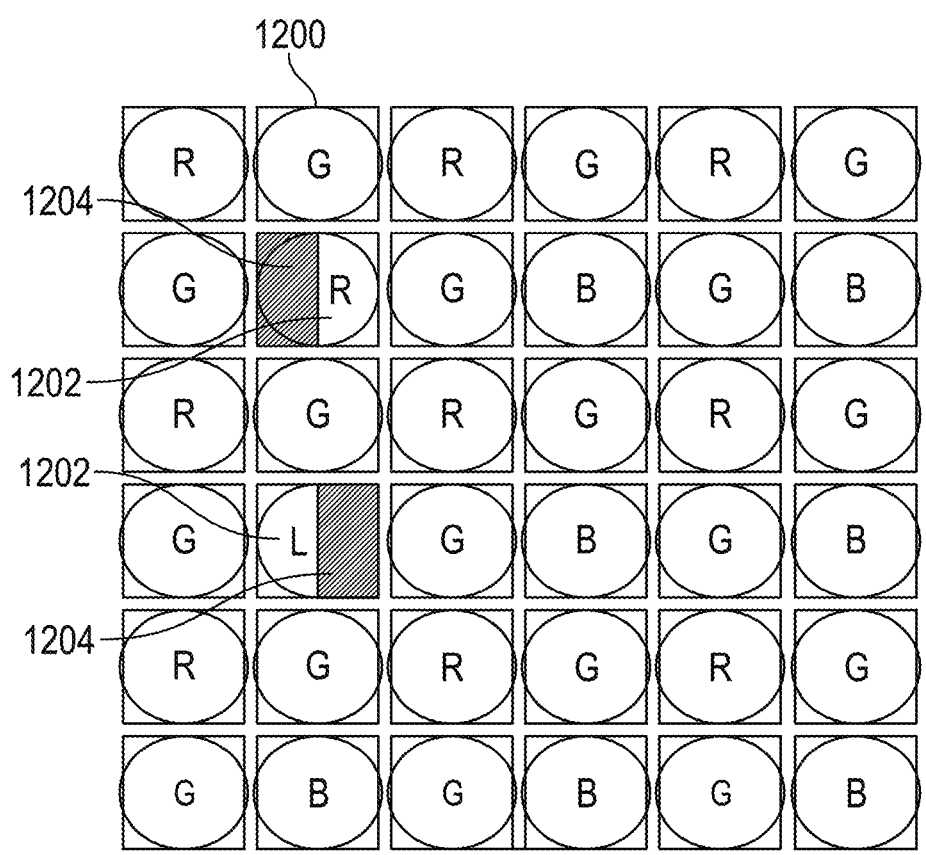
FIG. 12A-12C illustrate different approaches for configuring an array of image pixels for use in PDAF.

There are several common pixel design approaches that may be used for generating the left and right pixels for use in PDAF. FIG. 12A illustrates an example of sparse PDAF pixels that may be used to perform PDAF in accordance with some embodiments. An array of image pixels 1200 may comprise one or more particular pixels 1202 that are shielded (e.g., using metal shielding) that may be used to create left or right images for use in PDAF. For example, in some embodiments using sparse PDAF with metal shielding, 1%-3% of the image pixels are dedicated to left/right PDAF. On each of the shielded pixels 1202, a metal shield 1204 below a u-lens (or microlens, also referred to as an on-chip lens, or OCL) may create an effective asymmetric aperture by blocking light at certain interception angles, allowing for the capture of left or right image information for PDAF purposes. The u-lens or OCL may be used to increase the sensitivity of the underlying photodiode towards light. For imaging purposes, the values of the shielded pixels 1202 may be replaced by an interpolated value of the surrounding pixels, similar to how defective pixels may be corrected.

Figure 12B:
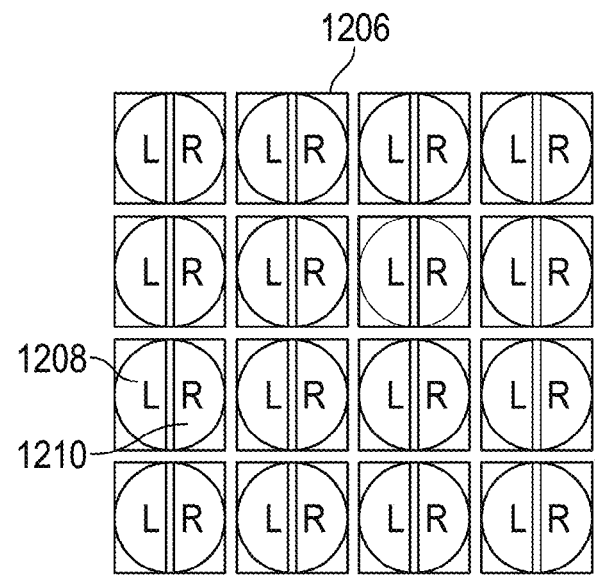

FIG. 12B illustrates an example of a dual photo diode system that may be used to perform PDAF, in accordance with some embodiments. In some embodiments, in a dual photo diode PDAF system (also referred to as a 2PD system), each pixel of the image pixel array 1206 may be designed with two photo-diodes (e.g., a left photodiode 1208 and a right photodiode 1210), wherein the left and right photodiodes 1208 and 1208 are positioned in relation to the u-lens to create an effective asymmetric aperture. The left and right photodiode levels are summed up to recreate a regular filter pattern, such as a Bayer pattern. In some embodiments, the high density of 2PD designs allows improved AF performance. As one having ordinary skill in the art will appreciate, the photodiode levels may be representative of an amount of light, which may be individually expressed as a binary value. As one example when the photodiode levels are expressed as ten-bit binary values, a low value (e.g., 100) may indicate a low amount of light, and a high value (e.g., 1024) may indicate a high amount of light.

Figure 12C:
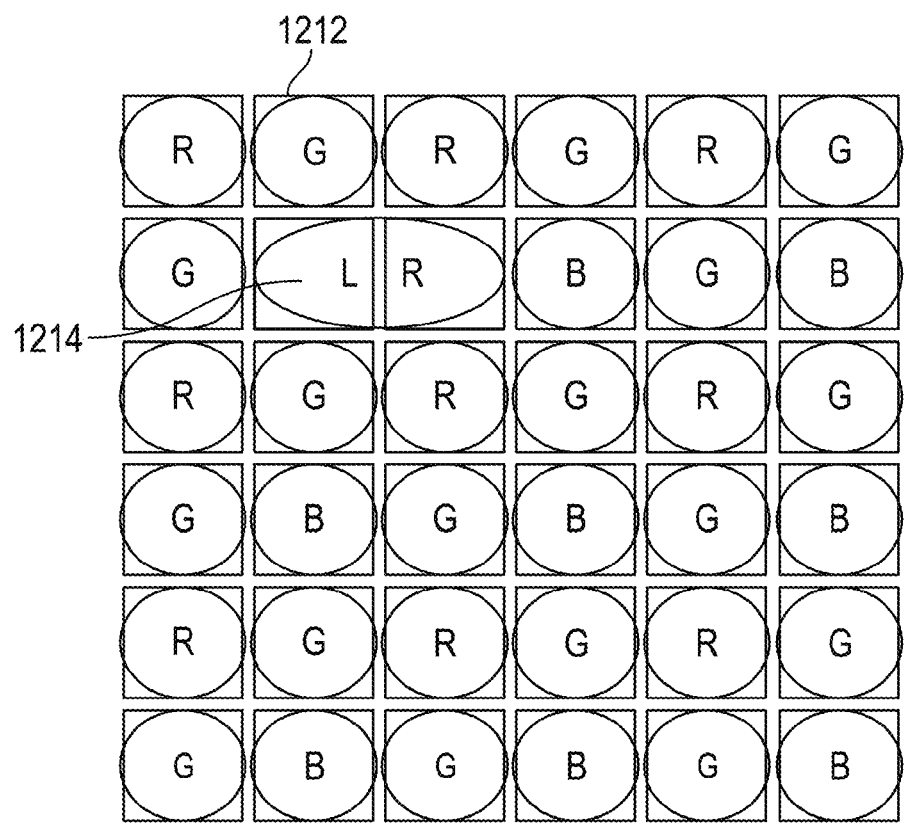

In some embodiments, sparse PDAF with 2×1 OCL may be used. FIG. 12C illustrates an example of sparse PDAF with 2×1 in accordance with some embodiments. As illustrated in FIG. 12C, the image pixel array 1212 may comprise an oval u-lens 1214 covering a pair of adjacent image pixels. In some embodiments, oval u-lenses may cover pairs of pixels on some of the image pixels of the image pixel array 1212. In a non-limiting example, oval u-lenses may cover pairs of pixels on or near 3% of the image pixels of the image pixel array 1212. Similarly to the 2PD design illustrated in FIG. 12B, the effective aperture for the pair of adjacent pixels (also referred to as L/R pixels) may be derived from the relative position of the pixels and the u-lens. In some embodiments, the absence of metal shielding (as shown in FIGS. 12B and 12C) allows the L/R pixels to collect more light, providing an advantage over the shielded design illustrated in FIG. 12A.

PDAF using a 2×1 design as illustrated in FIG. 12C is described in greater detail below in connection with FIGS. 1A-1D and FIG. 2, although it is understood that the techniques described below may be implemented with any type of PDAF system.

FIG. 1A depicts a schematic view of an example sensor portion 100 including a multi-diode microlens 110 that may be used to perform phase detection autofocus (PDAF) in accordance with some embodiments. The sensor portion includes single-diode microlenses 105A, 105B, multi-diode microlens 110, color filters 115A-115D, and photodiodes ("diodes") 120A-120D. Multi-diode microlens 110 is sized and positioned such that incoming light from a target scene propagates through the multi-diode microlens 110 before falling incident on the diodes 120B, 120C covered by the multi-diode microlens 110.

The diodes can be, for example, photodiodes formed in a semiconductor substrate, for example in a complementary metal-oxide semiconductor (CMOS) image sensor. As used herein, diode refers to a single unit of any material, semiconductor, sensor element or other device that converts incident light into current. The term "pixel" as used herein can refer to a single diode in the context of its sensing functionality due to adjacent optical elements such as color filters or microlenses. Accordingly, although "pixel" generally may refer to a display picture element, a "pixel" as used herein may refer to a sensor (for example, a photodiode) that receives light and generates a signal which if rendered on a display, may be displayed as a point in an image captured by the sensor (and a plurality of other sensors). The individual units or sensing elements of an array of sensors, for example in a CMOS or charge-coupled (CCD) device, can also be referred to as sensels.

Color filters 115A-115D act as wavelength-selective pass filters and split incoming light in the visible range into red, green, and blue ranges (as indicated by the R, G, and B notation used throughout the FIGs.). The light is "split" by allowing only certain selected wavelengths to pass through the color filters 115A-115D. The split light is received by dedicated red, green, or blue diodes 120A-120D on the image sensor. Although red, blue, and green color filters are commonly used, in other embodiments the color filters can vary according to the color channel requirements of the captured image data, for example including ultraviolet, infrared, or near-infrared pass filters.

Each single-diode microlens 105A, 105B is positioned over a single color filter 115A, 115D and a single diode 120A, 120D. Diodes 120A, 120D accordingly provide imaging pixel information. Multi-diode microlens 110 is positioned over two adjacent color filters 115B, 115C and two corresponding adjacent diodes 120B, 120C. Diodes 120B, 120C accordingly provide phase detection pixel information by diode 120B receiving light entering multi-diode microlens 110 in a first direction (L(X)) and diode 120C receiving light entering multi-diode microlens 110 in a second direction (R(X)). In some embodiments, the multi-diode microlens 110 can be a planoconvex lens having a circular perimeter, the at least one multi-diode microlens sized to pass light to a 2×2 cluster of diodes of the plurality of diodes. In other embodiments, the multi-diode microlens 110 can be a planoconvex lens having an oval perimeter, the at least one multi-diode microlens sized to pass light to a 2×1 cluster of diodes of the plurality of diodes.

As used herein, "over" and "above" refer to the position of a structure (for example, a color filter or lens) such that light incident from a target scene propagates through the structure before it reaches (or is incident on) another structure. To illustrate, the microlens array 105A, 110, 105B is positioned above the array of color filters 115A-115D, which is positioned above the diodes 120A-120D. Accordingly, light from the target scene first passes through the microlens array 105A, 110, 105B, then the array of color filters 115A-115D, and finally is incident on the diodes 120A-120D.

Placement of the microlenses above each diode 120A-120D redirects and focuses the light onto the active detector regions. Each microlens may be formed by dropping the lens material in liquid form onto the color filters 115A-115D on which the lens material solidifies. In other embodiments, wafer-level optics can be used to create a one or two dimensional array of microlenses using semiconductor-like techniques, where a first subset of the microlenses in the array include single-diode microlenses and a second subset of the microlenses in the array include multi-diode microlenses. As illustrated by single-diode microlens 105A, 105B and multi-diode microlens 110, each microlens may be a single element with one planar surface and one spherical convex surface to refract the light. Other embodiments of the microlenses may use aspherical surfaces, and some embodiments may use several layers of optical material to achieve their design performance.

Color filters 115A, 115D under single-diode microlenses 105A, 105B can be positioned according to the Bayer pattern in some embodiments. Accordingly, color filter 115A is either a red color filter or a blue color filter, while color filter 115D is a green color filter. Preserving the Bayer pattern for diodes 120A, 120D, and other diodes under single-diode microlenses can provide computational benefits, for example enabling use of widespread demosaicing techniques on captured image data. The Bayer pattern is a specific pattern for arranging RGB color filters on a rectangular grid of photosensors. The particular arrangement of color filters of the Bayer pattern is used in most single-chip digital image sensors used in digital cameras, camcorders, and scanners to create a color image. The Bayer pattern is 50% green, 25% red and 25% blue with rows of repeating red and green color filters alternating with rows of repeating blue and green color filters.

Although the color filters over which the single-diode microlenses 105A, 105B are positioned are described herein in the context of the Bayer pattern arrangement, such color filters can be arranged in other patterns that are 50% green color filters 25% blue color filters and 25% red color filters, other patterns that include more green color filters than blue or red color filters, or other patterns that have generally twice as many green color filters as blue or red color filters. The color filters can also be positioned according to other color filter patterns in some embodiments, for example color filter patterns designed for use with panchromatic diodes (sensitive to all visible wavelengths) and/or color filters for passing light outside of the visible spectrum.

As depicted with green color filter 115C, at least some of the color filters 115B, 115C positioned below the multi-diode microlens 110 may be different from a color filter that would otherwise be positioned in that location according to the Bayer pattern. As in the illustrated embodiment, color filters 115B, 115C between the multi-diode microlens 110 and the corresponding diodes 120B, 120C can be selected to pass green light. Accordingly, green correction is trivial as a full green pixel can be reconstructed by combining the values from diodes 120B, 120C. As such, the resulting image data does not lose any green channel information by having defective or missing green pixel information, as the green channel is particularly important for human vision. One possible concern is that this center green location can be shifted horizontally by ½ pixel from the original green pixel location in the Bayer pattern, however this offset may not have noticeable consequences with respect to quality of the final image. The example of combining the values from diodes 120B, 120C is provided to explain one process for performing green correction via simple interpolation (summing), however in other implementations green correction can be performed via higher order green interpolation (using additional green pixels in a predefined neighborhood).

In some embodiments, the "missing" color filter that is replaced by the green color filter 115C under the multi-pixel microlens can be a blue color filter, as the blue channel of image data is the least important for quality in terms of human vision. In other embodiments, green color filter 115C can be in the location where a red color filter would be if not for interruption of the color filter pattern due to the multi-diode microlens 110. Such color filter selections can be used, for example, in image sensors designed for common photography applications. In image sensors for other applications, image data color channels and color channel importance may vary and the color filter selections can vary accordingly.

FIG. 1A depicts (dashed) line 130 which should be understood is not a physical structure but rather is depicted to illustrate the phase detection capabilities provided by multi-diode microlens 110. The line 130 passes through the optical center of the multi-diode microlens 110 and passes orthogonally to a plane formed by the color filter array of color filters 115A-115D. Where multi-diode microlens is a 2×1 microlens, the multi-diode microlens 110 is formed such that light incident in a first direction (L(X)), that is, entering the multi-diode microlens 110 from one side of the line 130, is collected in a first diode 120B. Light incident in a second direction, that is, entering the multi-diode microlens 110 from the other side of the line 130, is collected in a second diode 120C. Accordingly, data received from diodes 120B, 120C can be used for phase detection. Where multi-diode microlens is a 2×2 microlens, the multi-diode microlens 110 is formed such that light is incident in four directions, with a direction considered as light passing through a quarter of the multi-diode microlens 110, is incident on four diodes.

Figure 1B:
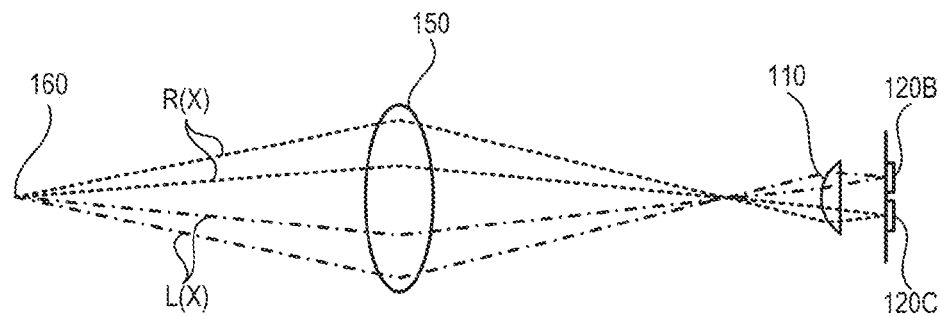
FIGS. 1B-1D depict example ray traces of light entering a pair of phase detection diodes.
Figure 1C:
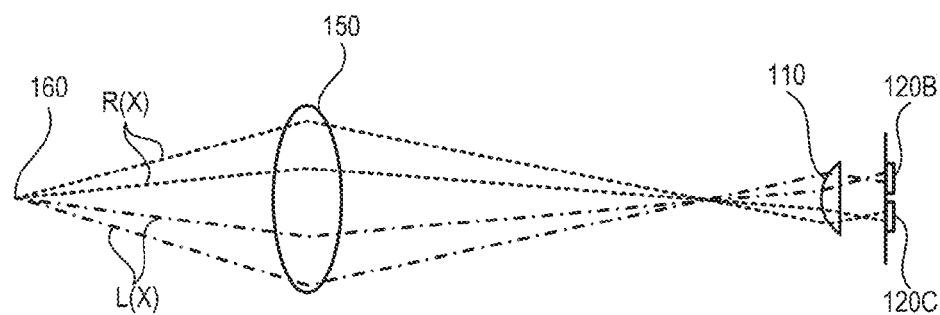
Figure 1D:
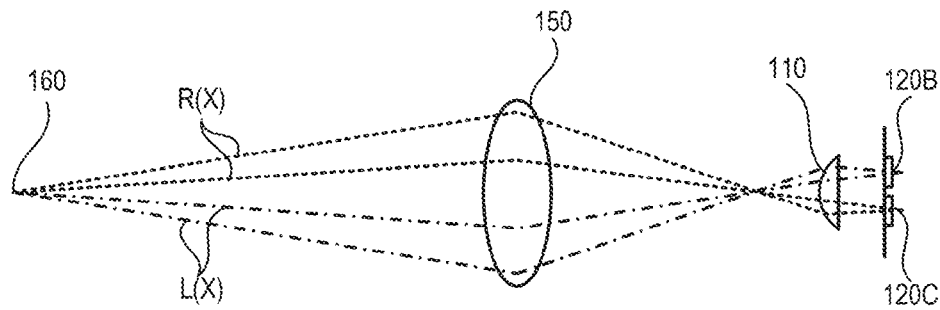

FIGS. 1B-1D depict example ray traces of light traveling through a main lens 150 then through a multi-diode microlens 110 before falling incident on a pair of phase detection diodes 120B, 120C. It will be appreciated that the dimensions of the main lens 150 and the multi-diode microlens 110 are not shown to scale. The diameter of the multi-diode microlens 110 can be approximately equal to the distance spanning two adjacent diodes of an image sensor, while the diameter of the main lens 150 can be equal to or greater than the width (the distance along a row or column of diodes) of the image sensor.

Specifically, FIG. 1B depicts an example ray trace of an in-focus condition, FIG. 1C depicts an example ray trace of a front-focus condition, and FIG. 1D depicts an example ray trace of a back-focus condition. Light travels from a point 160 in a target scene, travels through lens 150 for focusing the target scene onto an image sensor including the phase detection diodes 120B, 120C, and passes through the multi-diode microlens 110 before falling incident the phase detection diodes 120B, 120C. As illustrated, the phase detection diode 120B receives light from a left direction L(X) of the main lens 150 and the phase detection diode 120C receives light from a right direction R(X) of the main lens 150. In some embodiments light from the left direction L(X) can be light from a left half (depicted as the lower half in the illustration of FIGS. 1B-1C) of the main lens 150 and light from the right direction R(X) can be light from a right half (depicted as the upper half in the illustration of FIGS. 1B-1C) of the main lens 150. Accordingly, a number of phase detection diodes interleaved with imaging diodes across the image sensor can be used to extract left and right images that are offset from a center image captured by the imaging diodes. Rather than right and left, other embodiments can use up and down images, diagonal images, or a combination of left/right, up/down, and diagonal images for calculating autofocus adjustments.

When the image is in focus, the left rays L(X) and right rays R(X) converge at the plane of the phase detection diodes 120B, 120C. As illustrated in FIGS. 1C and 1D, in front and back defocus positions the rays converge before and after the plane of the diodes, respectively. As described above, signals from the phase detection diodes can be used to generate left and right images that are offset from the center image in front or back defocus positions, and the offset amount can be used to determine an autofocus adjustment for the main lens 150. The main lens 150 can be moved forward (toward the image sensor) or backward (away from the image sensor) depending on whether the focal point is in front of the subject (closer to the image sensor), or behind the subject (farther away from the image sensor). Because the autofocus process can determine both the direction and amount of movement for main lens 150, phase-difference autofocus can focus very quickly.

Figure 2:
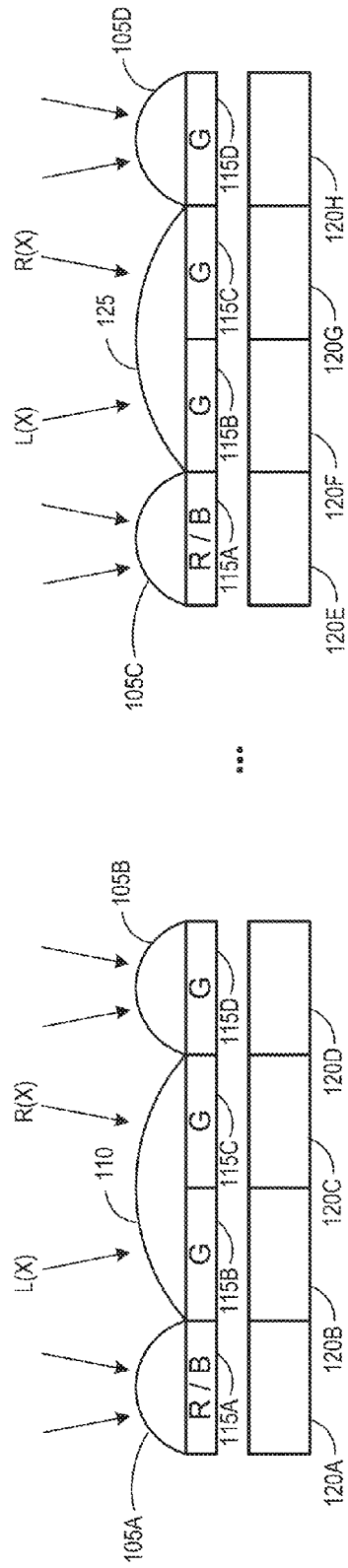
FIG. 2 depicts a schematic view of the example multi-diode microlens of FIG. 1A implementing an example of phase detection.

FIG. 2 depicts a schematic view of the example multi-diode microlens of FIG. 1A implementing an example of phase detection. FIG. 2 illustrates that the image sensor may include other phase detection locations, as shown by having additional single-diode microlenses 105C, 105D, additional multi-diode microlens 125, additional color filters 115E-H, and additional phase detection diodes 120E-H.

Incoming light is represented by arrows, and is understood to be incident from a target scene. As used herein, "target scene" refers to any scene or area having objects reflecting or emitting light that is sensed by the image sensor, or any other phenomena viewable by the image sensor. Light from the target scene propagates toward the phase detection diodes 120A-120H, and is incident on the diodes after first passing through the microlenses and then the color filter array.

To perform phase detection, the imaging system may save two images containing values received from the phase detection diodes based on light rays entering from the left-side (L(X)) and light rays entering from the right-side (R(X)). In the example illustrated in FIG. 2, L(X) and R(X) converge at the phase detection diodes 120B and 120C (for the multi-diode microlens 110) and converge at the phase detection diodes 120F and 120G (for the multi-diode microlens 125). In other words, for the multi-diode microlens 110, the phase detection diode 120B receives light entering from the left-side direction (L(X)), and the phase detection diode 120C receives light entering from the right-side direction (R(X)). Similarly, for the multi-diode microlens 125, the phase detection diode 120F receives light entering from the left-side direction (L(X)), and the phase detection diode 120G receives light entering from the right-side direction (R(X)).

diode 120F receives light entering multi-diode microlens 125 from the left-side direction and diode 120G receives light entering multi-diode microlens 125 from the right-side direction. Any number of multi-diode microlenses can be disposed over an image sensor ranging from one to all of the microlenses of the sensor, based on balancing the considerations of more multi-diode microlenses providing more reliable phase detection autofocus data but requiring greater amounts of computation for pixel value calculations and also increasing the likelihood of artifacts in a final image.

Focus can be calculated by applying a cross-correlation function to the data representing the left and right images. If the distance between the two images is narrower than the corresponding distance in an in-focus condition, the autofocus system determines that the focal point is in front of the subject. If the distance is wider than the reference value, the system determines that the focal point is behind the subject. The autofocus system can compute how much the lens position (or sensor position, in embodiments having a movable sensor) should be moved and in which direction and provide this information to the lens actuator to move the lens accordingly, providing for fast focusing. The above-described process can be performed by the image signal processor 920 of FIG. 9 in some examples.

Figure 3:
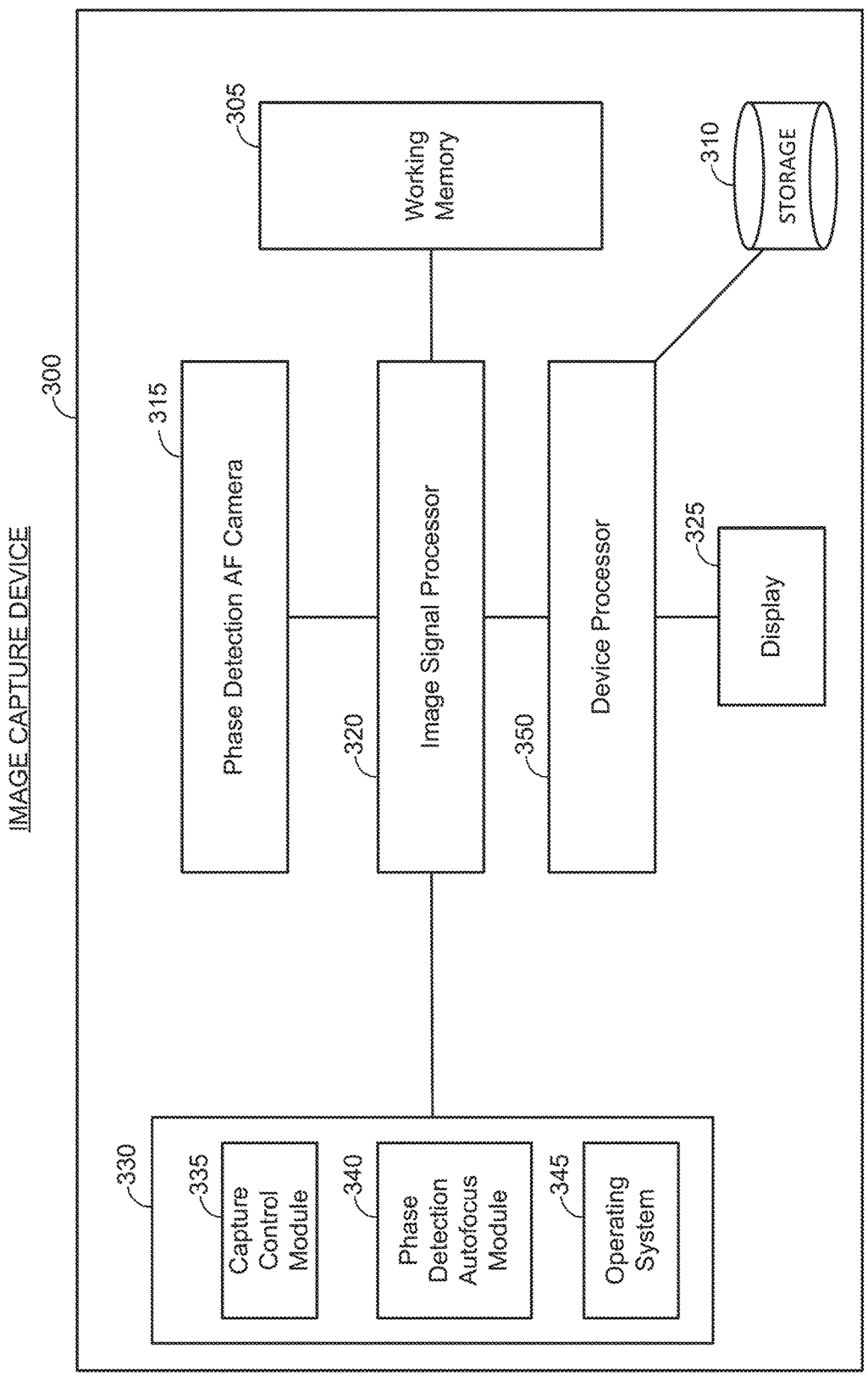
FIG. 3 depicts a schematic block diagram illustrating an example of an imaging system equipped with the phase detection autofocus devices and techniques.

FIG. 3 illustrates a high-level schematic block diagram of an embodiment of an image capture device 300 having a set of components including an image signal processor 320 linked to a phase detection autofocus camera 315. The device 300 and/or component(s) thereof may be utilized to perform PDAF on captured image data. The image signal processor 320 may be in communication with a working memory 305, memory 330, and device processor 350, which in turn is in communication with storage module 310 and an optional electronic display 325.

Image capture device 300 may be a portable personal computing device such as a mobile phone, digital camera, tablet computer, personal digital assistant, or the like. There are many portable computing devices in which using the phase detection autofocus techniques as described herein would provide advantages. Image capture device 300 may also be a stationary computing device or any device in which the techniques described herein would be advantageous. A plurality of applications may be available to the user on image capture device 300. These applications may include traditional photographic and video applications as well as data storage applications and network applications.

The image capture device 300 includes phase detection autofocus camera 315 for capturing external images. The phase detection autofocus camera 315 can include an image sensor having multi-diode microlenses and color filters arranged according to the embodiments described above. The phase detection autofocus camera 315 can also have a primary focusing mechanism positionable based at least partly on data received from the image signal processor 320 to produce an in-focus image of the target scene. In some embodiments, the primary focusing mechanism can be a movable lens assembly (e.g., comprising the lens 150) positioned to pass light from the target scene to the sensor. In some embodiments, the primary focusing mechanism can be a mechanism for moving the sensor.

The sensor of the phase detection autofocus camera 315 can have different processing functionalities in different implementations. In one implementation, the sensor may not process any data, and the image signal processor 320 may perform all needed data processing. In another implementation, the sensor may be capable of extracting phase detection pixels, for example into a separate Mobile Industry Processor Interface (MIPI) channel. Further, the sensor may additionally be capable of interpolating missing pixel values, for example in a RAW channel. In some implementations the sensor may additionally be capable of interpolating missing pixel values, for example in a normal channel, and may be able to process the whole phase detection calculation internally (on-sensor). For example, the sensor may include analog circuitry for performing sums, subtractions, and/or comparisons of values received from diodes. An imaging apparatus as described herein may include an image sensor capable of performing all phase detection calculations or an image sensor capable of performing some or no processing together with the image signal processor 320 and/or device processor 350.

The image signal processor 320 may be configured to perform various processing operations on received image data in order to execute phase detection autofocus and image processing techniques. Image signal processor 320 may be a general purpose processing unit or a processor specially designed for imaging applications. Examples of image processing operations include demosaicing, white balance, cross talk reduction, cropping, scaling (e.g., to a different resolution), image stitching, image format conversion, color interpolation, color processing, image filtering (e.g., spatial image filtering), lens artifact or defect correction, etc. The image signal processor 320 can also control image capture parameters such as autofocus and auto-exposure. Image signal processor 320 may, in some embodiments, comprise a plurality of processors. Image signal processor 320 may be one or more dedicated image signal processors (ISPs) or a software implementation of a processor. In some embodiments, the image signal processor 320 may be optional for phase detection operations, as some or all of the phase detection operations can be performed on the image sensor.

As shown, the image signal processor 320 is connected to a memory 330 and a working memory 305. In the illustrated embodiment, the memory 330 stores capture control module 335, phase detection autofocus module 340, and operating system module 345. The modules of the memory 330 include instructions that configure the image signal processor 320 or device processor 350 to perform various image processing and device management tasks. Working memory 305 may be used by image signal processor 320 to store a working set of processor instructions contained in the modules of memory. Alternatively, working memory 305 may also be used by image signal processor 320 to store dynamic data created during the operation of image capture device 300.

As mentioned above, the image signal processor 320 is configured by several modules stored in the memories. The capture control module 335 may include instructions that configure the image signal processor 320 to adjust the focus position of phase detection autofocus camera 315, for example in response to instructions generated during a phase detection autofocus technique. Capture control module 335 may further include instructions that control the overall image capture functions of the image capture device 300. For example, capture control module 335 may include instructions that call subroutines to configure the image signal processor 320 to capture image data including one or more frames of a target scene using the phase detection autofocus camera 315. In one embodiment, capture control module 335 may call the phase detection autofocus module 240 to calculate lens or sensor movement needed to achieve a desired autofocus position and output the needed movement to the imaging processor 320. Capture control module 335 may call the phase detection autofocus module 340 to interpolate color values for pixels positioned beneath multi-pixel microlenses.

Accordingly, phase detection autofocus module 340 can store instructions for executing phase detection autofocus. Phase detection autofocus module 340 can also store instructions for calculating color values for phase detection pixels and for image generation based on phase detection pixel values and imaging pixel values.

Operating system module 345 configures the image signal processor 320 to manage the working memory 305 and the processing resources of image capture device 300. For example, operating system module 345 may include device drivers to manage hardware resources such as the phase detection autofocus camera 315. Therefore, in some embodiments, instructions contained in the image processing modules discussed above may not interact with these hardware resources directly, but instead interact through standard subroutines or APIs located in the device processor 350. Instructions within operating system 345 may then interact directly with these hardware components. Operating system module 345 may further configure the image signal processor 320 to share information with device processor 350.

Device processor 350 may be configured to control the display 325 to display the captured image, or a preview of the captured image, to a user. The display 325 may be external to the imaging device 300 or may be part of the imaging device 300. The display 325 may also be configured to provide a view finder displaying a preview image for a user prior to capturing an image, for example to assist the user in aligning the image sensor field of view with the user's eye, or may be configured to display a captured image stored in memory or recently captured by the user. The display 325 may comprise an LCD, LED, or OLED screen, and may implement touch sensitive technologies.

Device processor 350 may write data to storage module 310, for example data representing captured images and data generated during phase detection and/or pixel value calculation. While storage module 310 is represented schematically as a traditional disk device, storage module 310 may be configured as any storage media device. For example, the storage module 310 may include a disk drive, such as an optical disk drive or magneto-optical disk drive, or a solid state memory such as a FLASH memory, RAM, ROM, and/or EEPROM. The storage module 310 can also include multiple memory units, and any one of the memory units may be configured to be within the image capture device 300, or may be external to the image capture device 300. For example, the storage module 310 may include a ROM memory containing system program instructions stored within the image capture device 300. The storage module 310 may also include memory cards or high speed memories configured to store captured images which may be removable from the camera. The storage module 310 can also be external to image capture device 300, and in one example image capture device 300 may wirelessly transmit data to the storage module 310, for example over a network connection. In such embodiments, storage module 310 may be a server or other remote computing device.

Although FIG. 3 depicts an image capture device 300 having separate components to include a processor, imaging sensor, and memory, one skilled in the art would recognize that these separate components may be combined in a variety of ways to achieve particular design objectives. For example, in an alternative embodiment, the memory components may be combined with processor components, for example to save cost and/or to improve performance.

Additionally, although FIG. 3 illustrates two memory components, including memory 330 comprising several modules and a separate memory component comprising a working memory 305, one with skill in the art would recognize several embodiments utilizing different memory architectures. For example, a design may utilize ROM or static RAM memory for the storage of processor instructions implementing the modules contained in memory 330. The processor instructions may be loaded into RAM to facilitate execution by the image signal processor 320. For example, working memory 305 may comprise RAM memory, with instructions loaded into working memory 305 before execution by the image signal processor 320.

Figure 4:
FIG. 4 illustrates an example image frame of a scene on which PDAF may be performed.

FIG. 4 illustrates an example image frame 400 of a scene on which PDAF may be performed. The scene depicted in the image frame 400 may contain one or more foreground objects (e.g., girl 402) as well as a plurality of background objects. In some autofocus systems, such as in contrast detection systems, a lens of the image capture device 300 (e.g., lens 150) may be moved between a plurality of different positions corresponding to different focus depths, in order to determine which objects in the scene are at focus at which depths. The lens 150 may then be positioned corresponding to a particular depth (e.g., a closest depth, a depth corresponding to a particular object, and/or the like).

On the other hand, because performing autofocus using PDAF allows for the depths of objects in the scene to be determined without moving the lens 150, a desired lens position may be determined much more quickly in comparison to contrast detecting autofocus or other techniques that require lens movement.

Figure 5A:
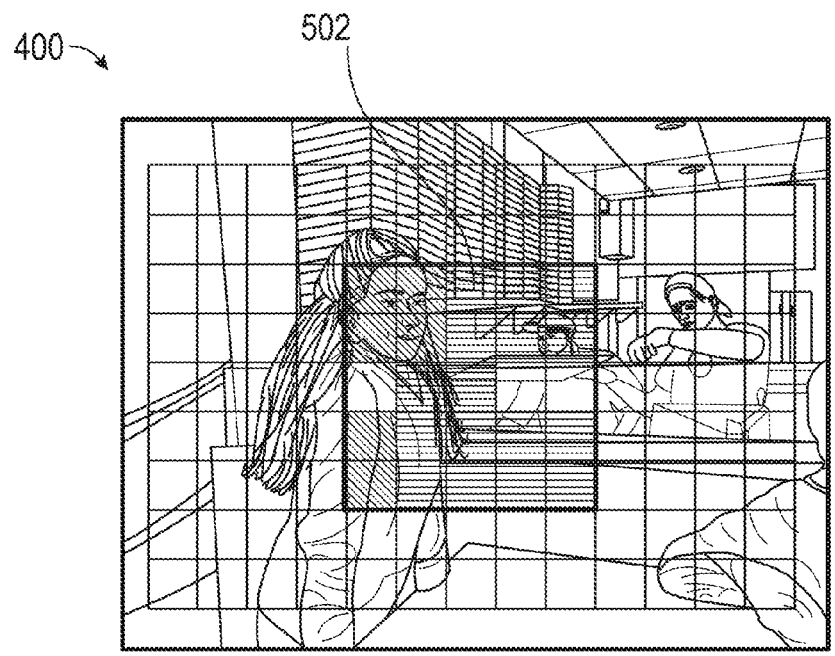
FIGS. 5A and 5B illustrate the image frame of FIG. 4 divided into a plurality of windows.
Figure 5B:
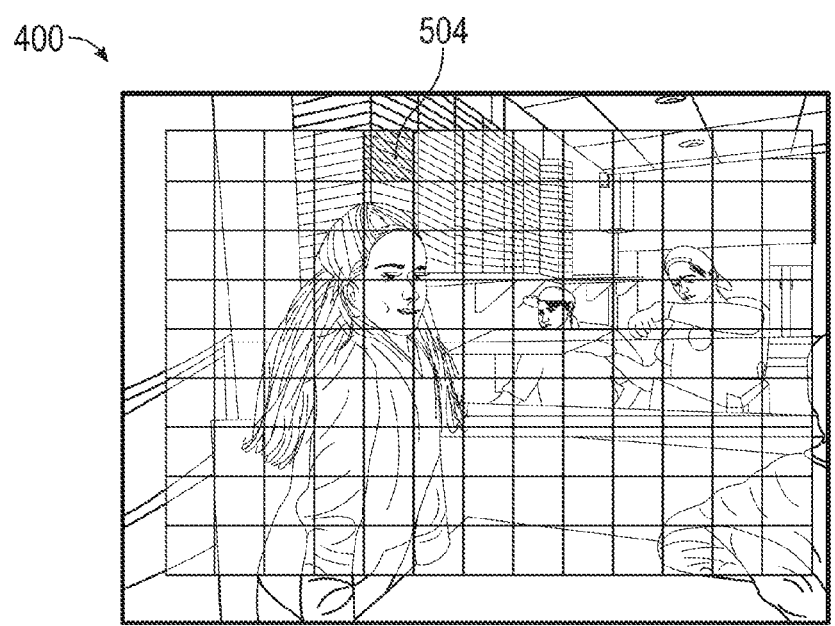

In some embodiments, PDAF may be performed on the image frame 400 of a scene by dividing the image frame 400 into a plurality of windows, each window corresponding to a different spatial area within the image frame 400. FIGS. 5A and 5B illustrate the image frame 400 of FIG. 4 divided into a plurality of windows. For example, the scene may be divided into a 13 by 9 grid of windows.

PDAF may be used to calculate a depth for each window of the image frame 400. The lens of the camera (e.g., lens 150) may then be positioned based upon a particular calculated depth in order to focus on a particular portion of the scene. For example, the lens may be positioned to focus on a depth corresponding to a desired foreground object in the scene (e.g., girl 402), such that the desired object will be in focus in the image frame 400. In some embodiments, the desired depth may correspond to a closest depth of the plurality of windows of the image frame 400.

However, in scenes with complex background with multiple objects at multiple different depths, it may be difficult to determine which depth corresponds to the desired lens position. In addition, some scenes may contain objects on the periphery of the image frame that have depths closer than the desired object. As one example, a desired object of a scene may correspond to a person standing within a hallway, and the walls and ceiling of the hallway may have depths closer than the person near the periphery of the image frame.

To more reliably determine a lens (e.g., the lens 150) position corresponding to a desired foreground object (e.g., the girl 402) in the image frame 400, the depths of windows within a central portion 502 of the image frame 400 may be considered first when determining a depth for positioning the lens during PDAF. As one example, the image capture device 300 may identify the central portion 502 (e.g., a 5×5 grid of windows, in this example) of the image frame 400. The image capture device 300 may then perform PDAF on the central portion 502. As foreground objects are often located within a central portion of an image frame (as is the case in the example of FIG. 5A), by processing the windows within the central portion 502 of the image frame 400, foreground objects may be reliably focused on even in scenes with highly detailed backgrounds (e.g., scenes having multiple background objects with different depths). In addition, in scenes with periphery objects closer to the camera than the desired object, first processing the windows within the central portion 502 may prevent the image capture device 300 from focusing on the periphery objects over desired foreground objects.

Continuing the above example, the image capture device 300 may determine a first depth value of the central portion 502 based on the PDAF performed on the central portion 502. The image capture device 300 may further determine a confidence value for the central portion 502 based on the first depth value. If the confidence value for the central portion 502 meets or exceeds a threshold value, as further described below, the image capture device 300 may proceed to set the lens position according to the first depth value without further processing a remainder of the image frame 400 (e.g., the windows outside of the central portion 502). Alternatively, if the confidence value for the central portion 502 does not meet or exceed the threshold value, the image capture device 300 may not set the lens position according to the first depth value. Such processes are further described in connection with FIGS. 8-11.

In some instances, the image capture device 300 may receive an indication of a location within the scene that is outside the central portion 502. For example, FIG. 5B illustrates an example location that falls within a periphery window 504 that is outside the central portion 502. The indication may comprise one of a user touch at the example location, a face detection at the example location, among other sources and/or image analysis tools that indicate a focus location at the periphery window 504. As one example, the indication may comprise a user specifying a particular region of the image frame 400 for which to focus by touching, at a spot near the periphery window 504, a touch screen (e.g., using a touch screen associated with the display 325, or other input device) displaying the image frame 400. Based on the indication, in addition to, or rather than, performing PDAF on the central portion 502, the image capture device 300 may identify at least one window closest to the touched spot (e.g., the periphery window 504, in this example). The image capture device 300 may then perform PDAF on the periphery window 504 and set the lens position according to the results (e.g., depth value(s)) of the PDAF. Such processes are further described in connection with FIGS. 6 and 7.

Figure 8A:
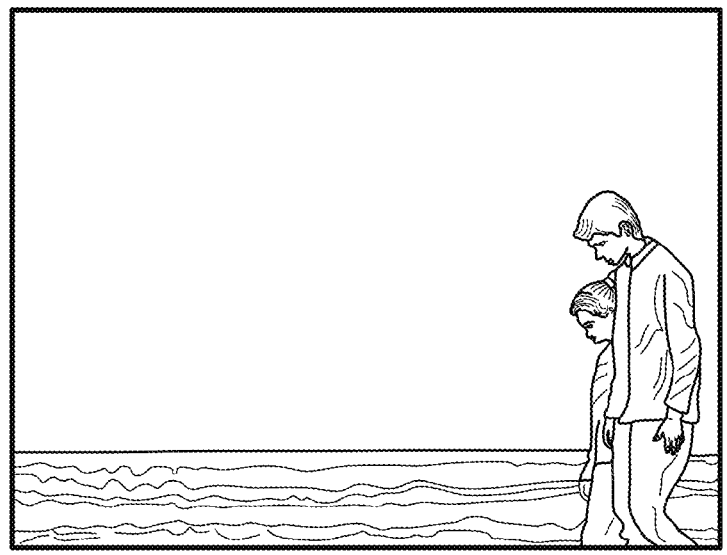
FIG. 8A illustrates an image frame of a scene with a central portion having low contrast and no foreground objects.

In some embodiments, even if the remaining windows of the image frame 400 outside the central portion 502 (e.g., hereinafter also referred to as "periphery windows") are not considered for the purpose of determining a desired focus depth, PDAF processing may still be performed on the periphery windows to determine their respective depths. For example, in some embodiments, the scene may not contain any foreground objects within the central portion 502 (e.g., as illustrated in FIG. 8A).

In some embodiments, a confidence value may be determined for each window of the image frame 400 for which PDAF processing is performed. In general, depths of objects within the image frame 400 within a certain depth from the image capture device 300 may be calculated with high confidence. However, as distance from the image capture device 300 increases, confidence may decrease. In addition, depth confidence may be low for areas of the image frame 400 having low contrast (e.g., sky, walls). As such, while depths of foreground objects (e.g., girl 402) may be calculated with high confidence, depths of background objects may have low confidence.

Therefore, if the image frame 400 does not have any foreground objects within the central portion 502, the calculated depths for the windows of the central portion 502 may have low confidence. When the calculated depths of the central portion 502 of the image frame have low confidence, the peripheral windows of the image frame may be considered (e.g., to determine if there are any foreground objects within the periphery windows of the image frame). As such, the lens 150 may be adjusted to a position corresponding to a calculated depth of a periphery window of the image frame 400.

In some embodiments, PDAF processing may be performed in software (e.g., using the image signal processor 320 or device processor 350) instead of hardware. In some software implementations, captured image frame data may be stored in a buffer prior to PDAF processing (e.g., to be used for later processing). In some embodiments, the buffer may be implemented as part of the memory 330 (e.g., within the phase detection autofocus module 340) or working memory 305 illustrated in FIG. 3.

In some embodiments, the buffer may store a left image and a right image corresponding to the image frame 400, from which depth information for the image frame 400 may be determined. In some embodiments, the pixels of the left and right images of the image frame 400 may be interleaved in the buffer. As such, corresponding pixels of the left and right images of an image frame 400 may be stored adjacent to each other in the buffer.

Figure 6A:
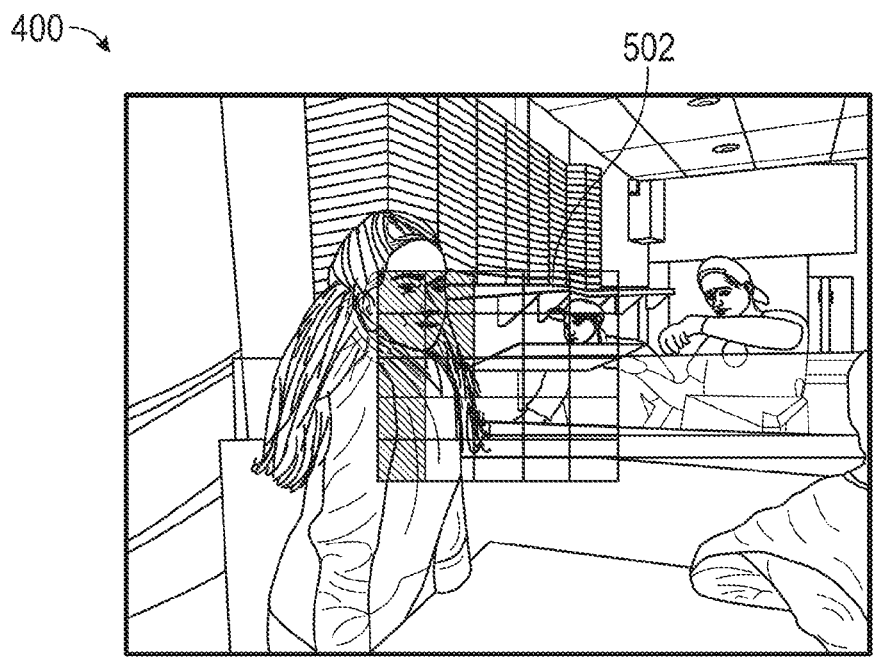
FIG. 6A illustrates windows of a central portion of the image frame of FIG. 4.
Figure 6B:
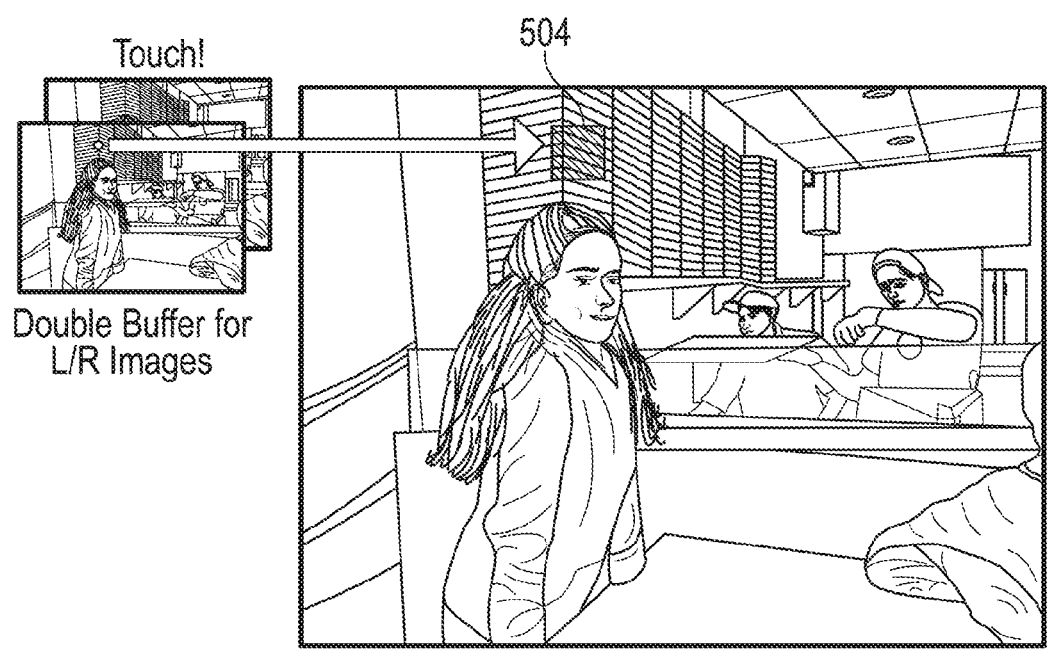
FIG. 6B illustrates a selected location outside a central portion of the image frame of FIG. 4.

FIG. 6A illustrates windows of a central portion of the image frame 400 of FIG. 4. FIG. 6B illustrates a selected location (e.g., the periphery window 504) outside a central portion (e.g., the central portion 502) of the image frame 400 of FIG. 4. As illustrated in FIG. 6A, the windows of the central portion 502 of the image frame 400 (e.g., the 5×5 grid of windows) are processed using PDAF to determine depths of the respective windows. The lens 150 may then be positioned based upon a determined depth (e.g., a closest depth corresponding to a foreground object). In this example, the periphery windows of the image frame 400 are not processed using PDAF.

By processing only the central portion 502 of the image frame 400, the amount of processing required and amount of power consumed may be reduced. For example, in some embodiments, the central portion 502 may comprise less than 30% of the field of view (FOV) of the image frame 400. In addition, in some embodiments, PDAF processing and lens movement may be performed and finished before the end of the image frame 400 is received in memory (e.g., working memory 305), allowing for the lens to be positioned faster and more responsively (discussed in greater detail below).

Because windows within the central portion 502 of the image frame 400 are processed first, if it is desired to focus on a periphery window 504 of the image frame outside the central portion 502, PDAF processing for the selected location (e.g., the periphery window 504) may be performed on the fly. For example, as described above in connection with FIG. 5B, one of a user touch at the location, a face detection at the location, among other sources and/or image analysis tools that indicate a focus location at the periphery window 504, may indicate a desire to focus on the periphery window 504 corresponding to the location. FIG. 6B illustrates that the periphery window 504 has been identified based on a touch. Because a last received image frame (e.g., comprising a left and right image for PDAF processing purposes) may be stored in the buffer, the stored image frame data may be accessed from the buffer and used to perform PDAF processing for the selected location (e.g., by identifying the periphery window 504 corresponding to the location, and performing PDAF on the identified window). As such, PDAF processing of the requested location may be performed immediately, without waiting for a new image frame of the scene to be received.

As further indicated in FIG. 6B, the buffer may comprise a double buffer containing data for both a last received image frame and a second-to-last received image frame. For example, newly received image frame data may be stored in the buffer by overwriting the second-to-last received image frame data. By using a double buffer, potential problems such as frame tearing may be avoided. For example, in embodiments where a single buffer (e.g., containing only a last received image frame) is used, if an error occurs while image frame data is being stored to the buffer, a frame tear may appear in the stored image data (e.g., a first portion of the stored image frame comprising new image frame data and a second portion comprising previously-stored image frame data). Artifacts from frame tears may be especially noticeable in cases where the camera or objects within the field of view of the camera has moved. On the other hand, in a double buffer, the previously-received image frame data is not overwritten until new image frame data is successfully received, alleviating the possibility of image tear.

In some embodiments, the buffer may comprise two or more buffers. For example, the buffer may comprise a first buffer for storing a last received image frame, and a second buffer for storing a second-to-last received image frame. In some embodiments, the last received image frame may be stored in a buffer of the two or more buffers having the oldest received image frame in comparison with the other buffers of the two or more buffers.

In some embodiments, PDAF processing may use a single buffer instead of a double buffer. Because the PDAF processing uses left/right images, frame tearing that may occur in single buffer configurations may not be a concern, as an error that interrupts the storage of new image frame data may not affect the left/right data of a particular location in the image frame. This may be because the left and right data for a particular location with the image frame is received at the same time. As such, any tearing effects will happen to the left/right data at the same time. In some embodiments, image data being written to the buffer and PDAF processing may both be performed in raster scan order, allowing for PDAF processing to be robust to frame tearing.

By processing certain portions (e.g., the central portion 502) of an image frame (e.g., the image frame 400) while also maintaining an image frame buffer in memory, an image capture device (e.g., the image capture device 300) may save power and reduce processing. For example, in some examples, a portion of an image frame may require PDAF processing (e.g., the central portion 502), while the remainder of the image frame may not, as described in connection with FIGS. 5A and 6A. In addition, in response to user-selected locations (e.g., touch functionality) or other image processing functions, PDAF processing can be performed on demand for the particular selected locations, as described in connection with FIGS. 5B and 6B.

FIG. 7A illustrates a flowchart of a process for an image capture device (e.g., the image capture device 300) to perform PDAF on an image frame (e.g., the image frame 400), in accordance with an embodiment. At block 702, left and right image data of the image frame 400 is received (e.g., by the image signal processor 320 from the phase detection AF camera 315). The left and right image data may correspond to data received through left and right image sensors (e.g., photodiodes 120B and 120C as illustrated in FIGS. 1B-1D).

At block 704, the image signal processor 320 may store the received left and right image data in a buffer. The buffer may be implemented in a memory 330 or working memory 305 as illustrated in FIG. 3. In some embodiments, the buffer may comprise a double buffer configured to store the received left and right image data as well as left and right image data from a previous image frame. In other embodiments, the buffer may be a single buffer configured to store left and right image data from a single image frame. In some embodiments, the left and right image data may be interleaved when stored in the buffer, such that left and right image data correspond to a particular location within the image frame may be adjacent to each other.

At block 706, the image signal processor 320 performs PDAF on a designated area of the image frame 400. In some embodiments, the image signal processor 320 may perform PDAF using the phase detection autofocus module 340. In some embodiments, the designated area may correspond to the central portion 502 of the image frame 400. In some embodiments, the designated area may comprise less than 30% of the total area of the image frame. In some embodiments, the image signal processor 320 may divide the image frame 400 into a plurality of windows, wherein the designated area comprises a subset of the plurality of windows. In some embodiments, performing PDAF on the designated area may comprise determining a depth value corresponding to each window of the designated area.

At block 708, in response to the performed PDAF, the image signal processor 320 may instruct the phase detection AF camera 315 to adjust a position of a lens (e.g., lens 150) to focus on a particular depth. The particular depth may correspond to the depth at a particular location within the designated area (e.g., a depth corresponding to a particular window within the designated area). In some embodiments, the depth may correspond to a foreground object appearing within the image frame. In some embodiments, the lens may be adjusted to focus on a closest depth identified within the designated area of the image frame.

Thus, the scenario described above in connection with FIGS. 5A and 6A (e.g., adjusting the lens based on performing PDAF on the central portion 502 including the girl 402) is one example scenario that may cause the image capture device 300 to perform the steps of the flowchart of FIG. 7A.

FIG. 7B illustrates a flowchart of a process for an image capture device (e.g., the image capture device 300) to perform PDAF on an image frame (e.g., the image frame 400), in accordance with another embodiment. As illustrated, blocks 702-708 for FIG. 7B may be the same as blocks 702-708 for FIG. 7A.

At block 710, an indication may be received indicating a location (e.g., near the periphery window 504) within the image frame 400 that is outside the designated area. The indication may result from one of a user touch at the location or a face detection at the location, among other sources and/or image analysis tools. In some embodiments, the image capture device 300 may skip one or more of blocks 702, 704, 706, and 708. For example, the image capture device 300 may receive and store left and right image data of a scene (as described in connection with blocks 702 and 704), and then skip directly to block 710 due to receiving the indication of the image frame location outside the designated area before performing PDAF on a central portion of the scene (as described in connection with block 706). As another example, the image capture device 300 may receive and store left and right image data of a scene (as described in connection with blocks 702 and 704), then perform PDAF on the central portion of the scene (as described in connection with block 706), and then skip directly to block 710 due to receiving the indication of the image frame location outside the designated area before adjusting the lens based on the performed PDAF (as described in connection with block 708).

At block 712, the image signal processor 320 retrieves left and right image data associated with the indicated location from the buffer. In some embodiments, the image signal processor 320 may identify one or more windows associated with the indicated location, and retrieve left/right image data corresponding to the identified one or more windows.

At block 714, the image signal processor 320 performs PDAF on the indicated location, based upon the retrieved left/right image data. In some embodiments, the phase detection AF camera 315 may adjust a position of a lens (e.g., the lens 150) to focus on the particular depth of the indicated location, as determined by the performed PDAF.

Thus, the scenario described above in connection with FIGS. 5B and 6B (e.g., including an indicated location corresponding to the periphery window 504) is one example scenario that may cause the image capture device 300 to perform the steps of the flowchart of FIG. 7B.

Although the above description may refer to the process of FIGS. 7A and 7B as being primarily performed using the image signal processor 320, it is understood that in other embodiments, at least a portion of the process may be performed by the device processor 350, a combination of the image signal processor 320 and the device processor 350, and/or one or more other processors.

FIG. 8A illustrates an image frame 800 of a scene with a central portion 802. Similar to the functionality described above in connection with FIG. 5A, when performing PDAF on the central portion 802, the image capture device 300 may determine a first depth value of the central portion 802 based on the PDAF performed on the central portion 802.

Thereafter, the image capture device 300 may determine a confidence value for the central portion 802 based on the first depth value. The confidence value may represent a level of confidence that the image capture device 300 has in the accuracy of the first depth value for the central portion 802. As described above, as scene distance increases and as contrast decreases, the confidence value may generally be lower. For example, if a central portion has low contrast (e.g., because the central portion is entirely, or mostly, comprised of a clear, blue sky), or contains little-to-no foreground objects, for example, the confidence value may be low. In contrast, if a central portion has high contrast (e.g., it contains close-ups of faces), or contains many foreground objects, for example, the confidence value may be high. If the confidence value for the central portion 802 meets or exceeds a threshold value, the image capture device 300 may proceed to set a lens (e.g., the lens 150) position according to the first depth value without further processing a remainder of the image frame 800, as further described below. Alternatively, if the confidence value for the central portion 802 does not meet or exceed the threshold value, the image capture device 300 may not set the lens position according to the first depth value.

As a non-limiting example, the threshold value may be predetermined to be 100. Furthermore, the confidence value may be stored in a software library, e.g., "PDLIB." In this case, the image capture device 300 may access the PDLIB to compare the confidence value with the threshold value. For instance, if the PDLIB indicates a confidence of 500, and the threshold value is 100, then since the confidence value exceeds the threshold value, the image capture device 300 may be configured to proceed with adjusting the lens 150 according to the depth value calculated from the PDAF that the confidence value (of 500) is based on. In another instance, if the PDLIB indicates a confidence of 20, and the threshold value is 100, then since the confidence value does not meet or exceed the threshold value, the image capture device 300 may be configured to not adjust the lens 150 according to the depth value calculated from the PDAF that the confidence value (of 20) is based on. Instead, the image capture device 300 may proceed to identify and perform PDAF on portions outside of the center portion, as further described below.

In the illustrated example, the central portion 802 is comprised of a clear sky in the distance with low contrast. As such, performing PDAF processing on the central portion 802 may result in a low confidence value. Thus, the confidence value for the central portion 802 may not meet or exceed an example threshold value. In this case, the image signal processor 320 may then identify one or more additional peripheral regions of the image frame 800.

Figure 8B:
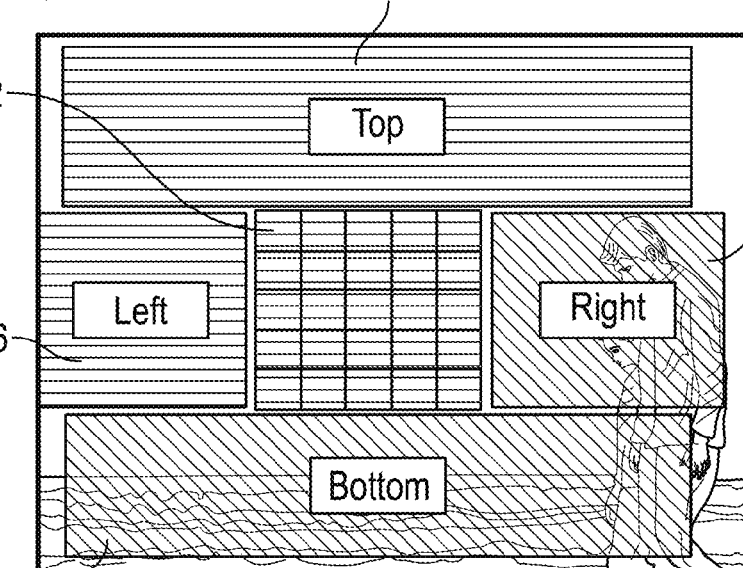
FIG. 8B illustrates the scene of FIG. 8A with a central portion and periphery regions corresponding to the top, bottom, left, and right of the central portion of the image frame.

To that end, FIG. 8B illustrates the scene of FIG. 8A with a central portion 802 and periphery regions 804, 806, 808, and 810, corresponding, respectively, to the top, left, bottom, and right of the image frame 800. In the illustrated embodiment, four periphery regions are identified, each corresponding to a different side of the central portion. In the instance where the confidence value for the central portion 802 does not meet or exceed the threshold value, processing of the periphery regions 804, 806, 808, and 810 may be used to identify foreground objects corresponding to a depth at which to position a lens (e.g., the lens 150).

In one example, the image capture device 300 may first identify and perform PDAF on the top periphery region 804. As illustrated, the top periphery region 804 is also comprised of a clear sky, and thus, may also result in a low confidence value for PDAF performed thereon. Following this example, the image capture device 300 may then identify and perform PDAF on the left periphery region 806. As illustrated, the (for a region 806 is also comprised of a clear sky, and thus, may also result in a low confidence value for PDAF performed thereon. Following this example, the image capture device 300 may then identify and perform PDAF on the right periphery region 810 or the bottom periphery region 808. In either case, the right periphery region 810 and the bottom periphery region 808, as illustrated, include at least portions of high-contrast, close subjects. Thus, performing PDAF on these regions may result in depth value(s) having high confidence. Thus, the image capture device 300 may then proceed to use the depth value for one of the right periphery region 810 or the bottom periphery region 808 to determine a distance and direction to move the lens 150 such that the foreground objects are in focus (e.g., a measure of defocus or a "defocus value"). Said another way, the defocus value is a measure of how far the current lens position is from the optimum focus position. As such, the lens 150 may be adjusted (e.g., "set") to a position corresponding to a depth of a foreground object detected in the periphery regions 810 or 808. In other embodiments, the image capture device 300 may perform PDAF on the regions surrounding the central portion 802 in a different order.

Figure 8C:
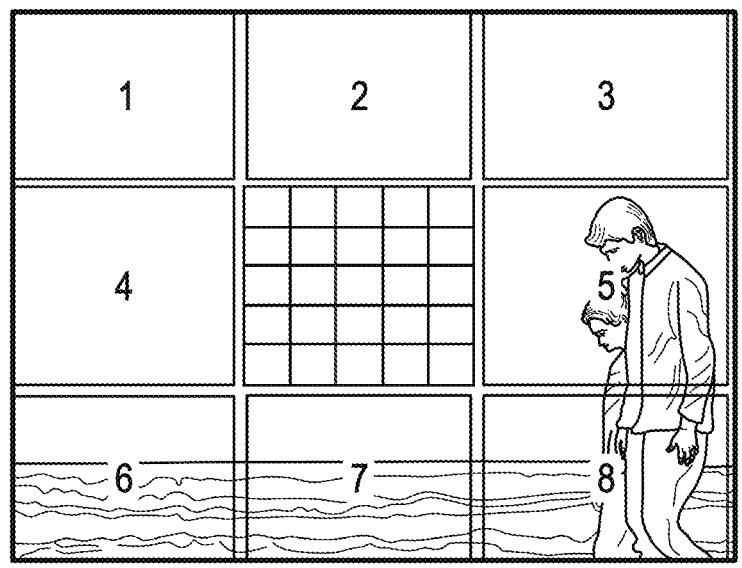
FIG. 8C illustrates the scene of FIG. 8A with a central portion and eight periphery regions, in accordance with some embodiments.

Although FIGS. 8A and 8B illustrate a particular configuration of peripheral regions for the image frame 800, it is understood that other configurations of peripheral regions may be used. For example, FIG. 8C illustrates an image frame 800 having eight different periphery regions surrounding the central portion 802.

Figure 9:
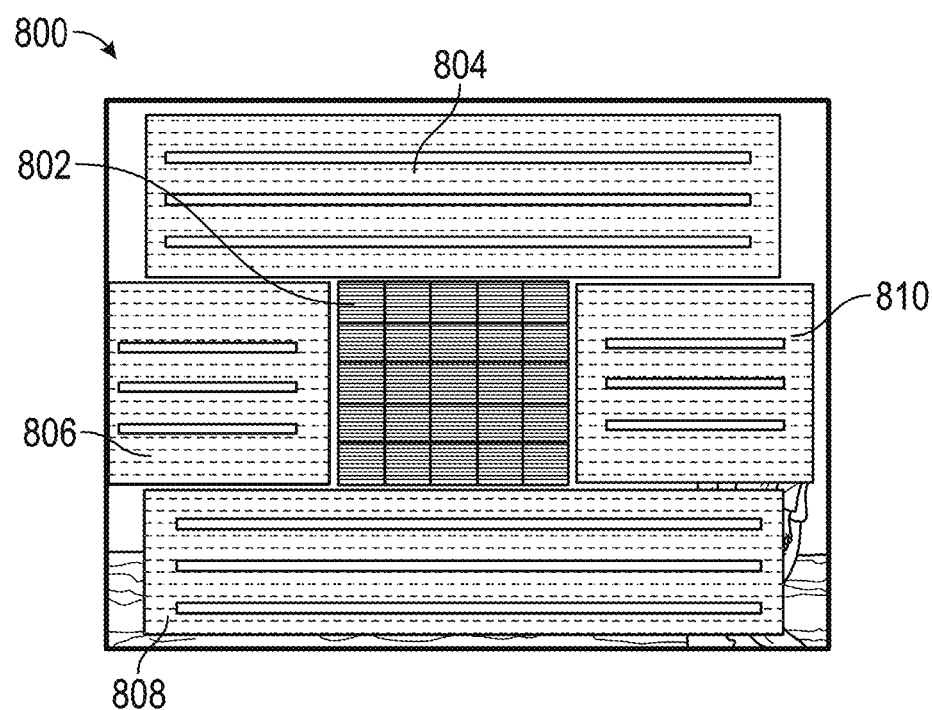
FIG. 9 illustrates a diagram of how PDAF processing may be performed for different portions of an image frame, in accordance with some embodiments.

In some embodiments, the image signal processor 320 may process the periphery regions in a manner that optimizes for efficiency. FIG. 9 illustrates a diagram of how PDAF processing may be performed for different portions of the image frame 800, in accordance with some embodiments. In some embodiments, the central portion 802 of the image frame may be processed with a dense sampling of left/right pixels. For example, the image signal processor 320 may perform PDAF on the central portion 802 of the image frame 800 utilizing each left/right pixel pair of the stored image frame data. On the other hand, PDAF processing for the periphery regions surrounding the central portion 802 (e.g., the periphery regions 804, 806, 808, and 810, collectively referred to as "the periphery regions 804-810") may use a sparser sampling of left/right pixels.

For example, the image signal processor 320 may perform PDAF on the periphery regions 804-810 with a sampling of the stored left/right pixel pair data, resulting in increased space between consecutive pairs of left/right pixels in processing order used for PDAF processing of the periphery regions 804-810. As such, this results in less data having to be processed, and the image signal processor 320 may perform PDAF processing on the periphery regions 804-810 more efficiently in comparison to PDAF processing of the central portion 802.

In some embodiments, received image data may be downscaled, such that PDAF processing of the periphery regions 804-810 may be at a lower resolution in comparison to PDAF processing of the central portion 802. Any type of downscaling operation may be used, such as sparse sampling, bilinear downsampling, and/or the like. In some embodiments, the received image data of the periphery regions 804-810 of the image frame 800 may be downscaled across a vertical axis, a horizontal axis, or both. In some embodiments, performing PDAF processing of the periphery regions 804-810 may comprise processing only a portion of the pixels within one or more of the periphery regions 804-810.

In some embodiments, PDAF processing of the periphery regions 804-810 may be performed at a lower rate in comparison to the central portion 802. For example, in some embodiments, PDAF processing of the periphery regions 804-810 may only be performed for every other received image frame. In some embodiments, only one periphery region of the periphery regions 804-810 may undergo PDAF processing for each image frame. As such, PDAF processing of all of the periphery regions 804-810 for the image frame 800 may be completed over a certain number of received frames (e.g., four frames when there are four periphery regions per frame, eight frames when there are eight periphery regions per frame etc.).

In some embodiments, the area of the periphery regions 804-810 may be much larger than that of the central portion 802 (e.g., ten times larger). If the periphery regions 804-810 were processed using the same density or complexity as the central portion 802, the overall processing time when processing the periphery regions 804-810 will be significantly higher compared to the central portion 802. By performing PDAF processing on the periphery regions 804-810 with less density or complexity, the processing time required to perform PDAF processing on the periphery regions 804-810 may be reduced.

Figure 10:
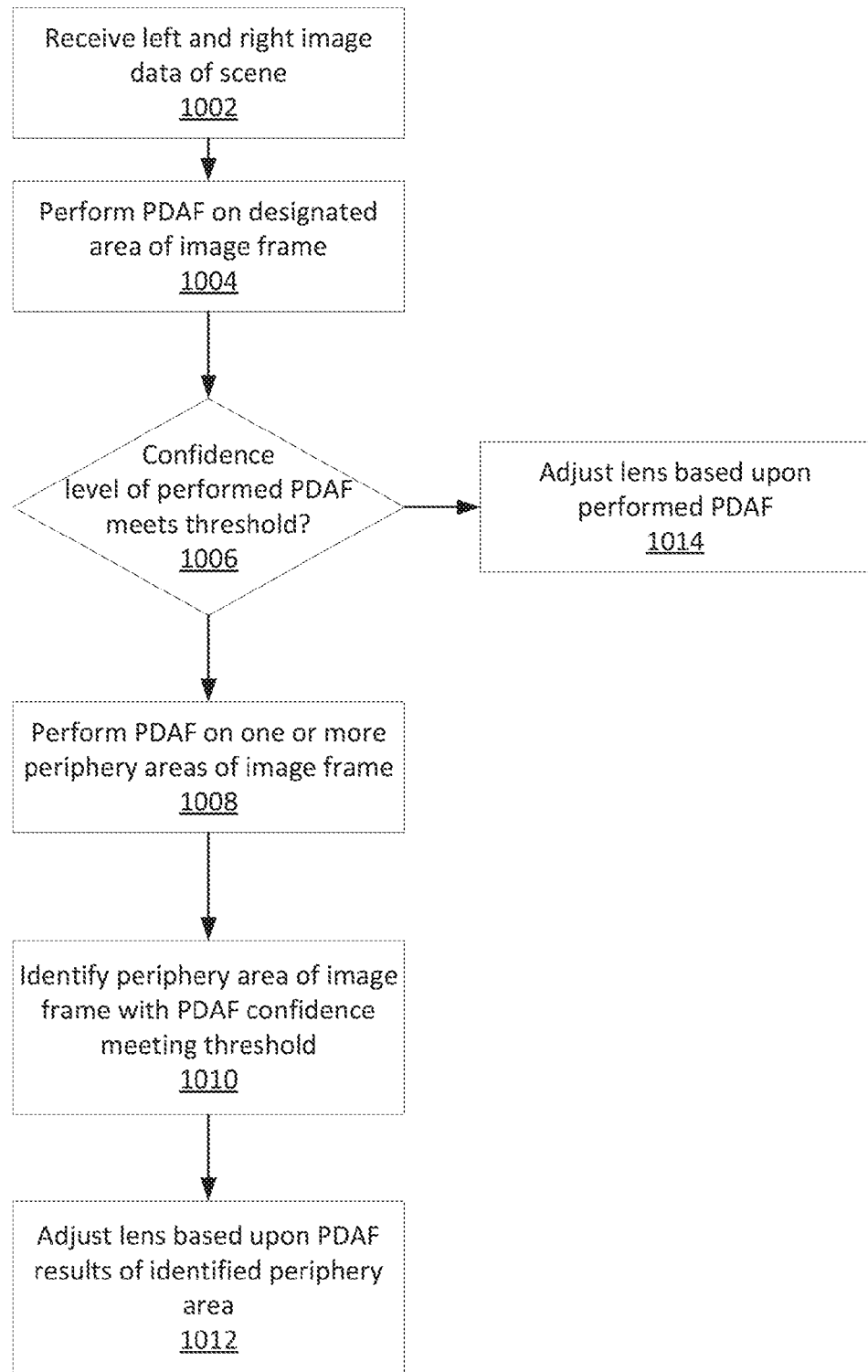
FIG. 10 illustrates a flowchart of a process for performing PDAF processing, in accordance with some embodiments.

FIG. 10 illustrates a flowchart of a process for performing PDAF processing, in accordance with some embodiments. At block 1002, left and right image data of an image frame are received (e.g., by the image signal processor 320 from the phase detection AF camera 315). The received left/right image data may be stored in a buffer (e.g., implemented in the memory 330 or the working memory 305). In some embodiments, receiving and storing the left/right image data may be similar to blocks 702 and 704 described in connection with FIGS. 7A and 7B.

At block 1004, the image signal processor 320 performs PDAF on a designated area of the image frame (e.g., a central portion of the image frame). In some embodiments, this may be similar to block 706 described in connection with FIGS. 7A and 7B.

At block 1006, the image signal processor 320 may determine a confidence level of the performed PDAF and determine if the confidence level meets or exceeds a threshold value. For example, if the designated area of the image frame upon which PDAF was performed contains one or more foreground objects, the confidence value may satisfy the threshold. On the other hand, if there are no foreground objects within the designated area of the image frame, it is possible that the confidence value does not meet the threshold value.

In some embodiments, the image signal processor 320 may determine a confidence value for each window of the designated area of the image frame for which PDAF was performed. The image signal processor 320 may determine that the confidence level of the performed PDAF meets the threshold value if at least one confidence value of a window in the designated area exceeds the threshold value. Conversely, the image signal processor 320 may determine that the confidence level does not meet the threshold value if none of the confidence values for the windows within the designated area meet the threshold value.

If the image signal processor 320 determines that the confidence value meets the threshold value, then the process may proceed to block 1014, where a lens position may be adjusted based upon the performed PDAF (e.g., similar to block 708 described in connection with FIGS. 7A and 7B). On the other hand, if the image signal processor 320 determines that the confidence value does not meet the threshold, then at block 1008, the image signal processor 320 may perform PDAF on one or more periphery regions of the image frame. In some embodiments, the periphery regions may correspond to regions of the image frame outside the designated area of the image frame (e.g., the periphery regions 804-810, which surround the central portion 802 of the image frame 800). In some embodiments, PDAF for the periphery regions may be performed using a sparser sampling of image data in comparison with the designated area of the image frame.

At block 1010, the image signal processor 320 may identify a periphery region of the one or more periphery regions containing calculated PDAF depth values having confidence values that meet the threshold value. In some embodiments, this may indicate that the identified periphery region contains one or more foreground objects.

At block 1012, a lens (e.g., the lens 150) position may be adjusted based upon the calculated PDAF depth values of the identified periphery region. For example, the lens 150 may be adjusted to focus on a depth corresponding to a calculated PDAF depth value of the identified periphery region.

By first performing PDAF processing on a designated area of the image frame (e.g., the central portion of the image frame), and performing PDAF on periphery regions when a confidence of the designated area fails to reach a threshold value, the amount of processing needed to perform PDAF may be reduced. In addition, by performing PDAF on the periphery regions using a sparser image data sampling in comparison with the designated area, processing costs may be further reduced.

In some embodiments, in response to a selection of a particular location outside the designated area of the image frame (e.g., due to user input or one or more image analysis tools), the image signal processor 320 may identify a window of the image frame corresponding to the selected location. The image signal processor 320 may perform PDAF on the identified window using the same sampling as for windows within the designated area of the image frame, instead of the sparser sampling used for performing PDAF on periphery regions of the image frame.

In some embodiments, receiving and storing image frame data in the buffer may take a large amount of time. In addition, performing PDAF processing may consume additional time. For example, in some embodiments, it may take 30 ms to retrieve and store image frame data for a particular image frame and 10 ms to perform PDAF processing on a central portion of an image frame. As a result, it may take 40 ms or more to position the lens at a desired position to achieve the desired focus. In contrast, the time required to move the lens to the desired position may be relatively small (e.g., 2-10 ms).

In some embodiments, receiving/storing of image frame data and PDAF processing may be performed in increments. For example, the system hardware (e.g., the phase detection AF camera 315, the device processor 350, and/or the image signal processor 320), while storing received image frame data (e.g., into the buffer implemented as part of the memory 330 or working memory 305), may be configured to interrupt the storing of the image frame data at certain intervals (e.g., corresponding to certain lines or portions of the image frame). At these intervals, the system hardware (e.g., the phase detection AF camera 315, the device processor 350, and/or the image signal processor 320) may inform a software library (e.g., the PDLIB) performing the PDAF processing that a certain amount of the image frame has been stored. The PDLIB may then perform PDAF processing on the stored portions of the image frame in parallel with the continued storage of image frame data.

Figure 11A:
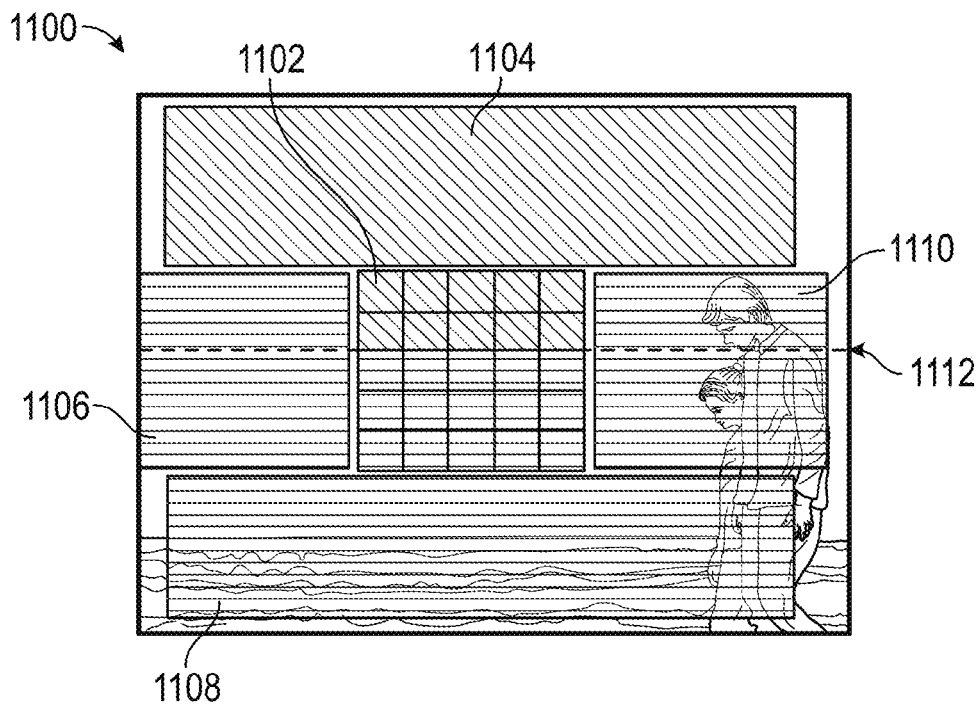
FIGS. 11A-11C illustrate an example of incremental PDAF processing, in accordance with some embodiments.
Figure 11B:
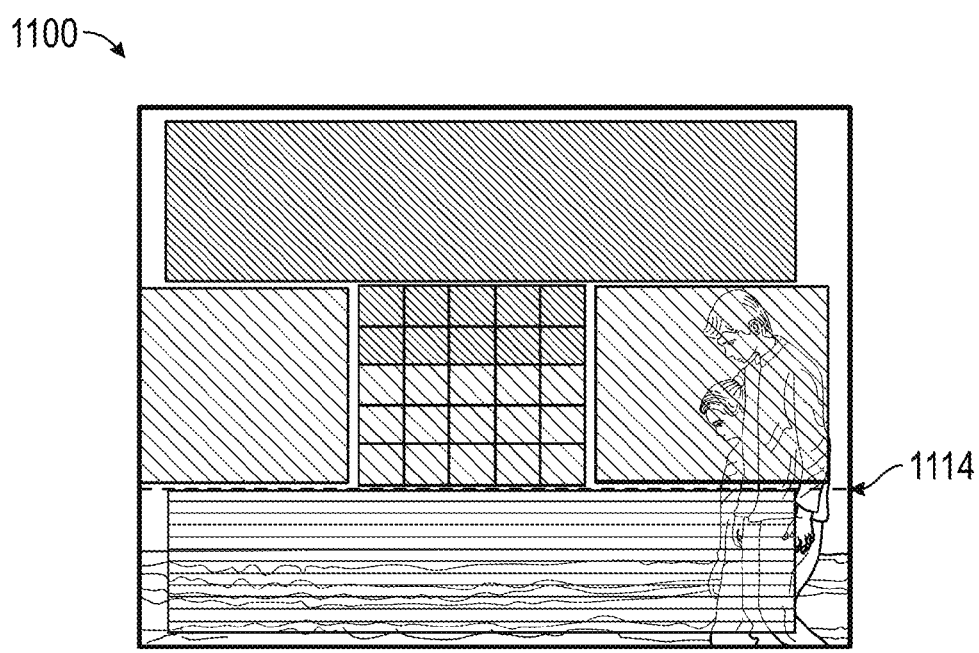
Figure 11C:
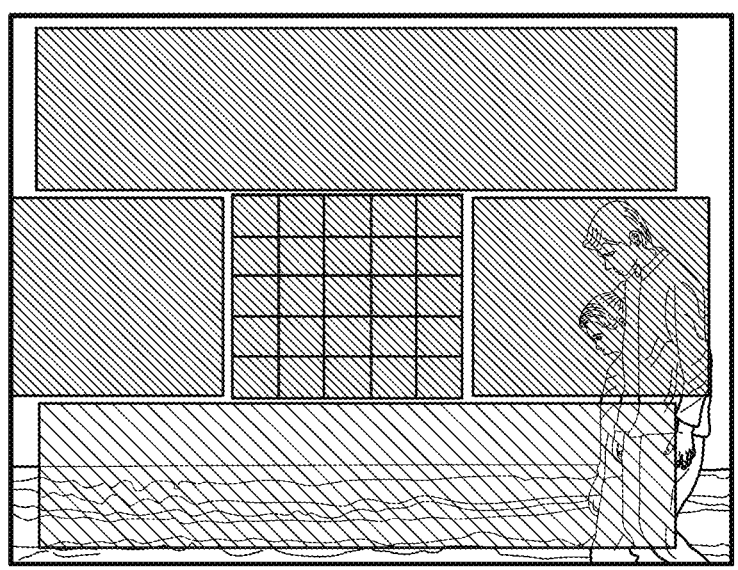

FIGS. 11A-11C illustrate an example of incremental PDAF processing, in accordance with some embodiments. As illustrated in FIGS. 11A-11C, an image frame 1100 may be divided into a central portion 1102 and a plurality of periphery regions 1104-1110. In some embodiments, image data for the image frame 1100 may be received from the top-down, although it should be understood that in other embodiments, image frame data may be received in other orders. In some embodiments, as the image data for the image frame 1100 is received, the system hardware of the camera 315 may interrupt the storing of the image frame data at particular intervals when a certain amount of the image frame 1100 has been stored.

For example, as illustrated in FIG. 11A, a first interrupt may occur at point 1112 when half of the image frame 1100 has been stored in the buffer and is ready for processing, as indicated by the portions of the image frame 1100 of FIG. 11A that are marked with diagonal lines. As such, the software library, PDLIB, may be called to perform PDAF processing on the windows of the received portion of the central portion 1102 of the image frame 1100 (e.g., the first two rows of windows within the central portion 1102) as the image frame data continues to be received.

As illustrated in FIG. 11B, a second interrupt may occur at a point 1114 when the entirety of the central portion 1102 of the image frame 1100 has been received, as indicated by the portions of the image frame 1100 of FIG. 11B that are marked with diagonal lines. The portions of the image frame 1100 of FIG. 11B marked with diagonal lines of a higher density correspond to the portions that were already processed as described in connection with FIG. 11A. As such, PDLIB may be called to perform PDAF processing on the remaining area of the central portion 1102 (e.g., the third, fourth, and fifth rows of windows within the central portion 1102) as the image frame data continues to be received.

As illustrated in FIG. 11C, the entire image frame 1100 has been received, as indicated by the portions of the image frame 1100 of FIG. 11C that are marked with diagonal lines. The portions of the image frame 1100 of FIG. 11C marked with diagonal lines of a higher density correspond to the portions that were already processed as described in connection with FIGS. 11A and 11B. At this point, processing of the central portion 1102 of the image frame 1100 may have concluded. This allows for the phase detection AF camera 315 to position the lens 150 at an appropriate position immediately in preparation for receiving a next image frame, without having to wait for additional processing, allowing for the autofocus function of the camera 315 to be more responsive.

In some embodiments, only the central portion 1102 of the image frame 1100 may have been processed using PDAF after the first and second interrupts, with the periphery regions 1104-1110 processed if it is determined that the central portion 1102 shows low confidence. In other embodiments, the periphery regions 1104-1110 may be processed as soon as they are available (e.g., the top periphery region 1104 being processed after the first interrupt, and the left and right periphery regions 1106 and 1110 after the second interrupt). In some embodiments, because the entirety of the central portion 1102 may be processed following the interrupt at the point 1114, PDAF processing of the periphery regions 1104-1110 may commence before the entirety of the image frame 1100 has been received.

Figure 11D:
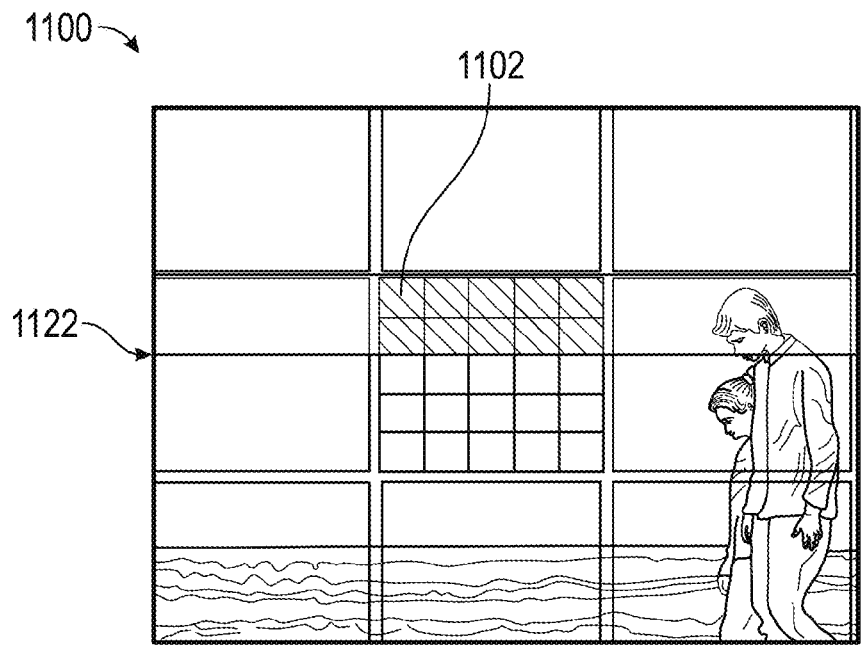
FIGS. 11D-11F illustrate another example of incremental PDAF processing, in accordance with some embodiments.
Figure 11E:
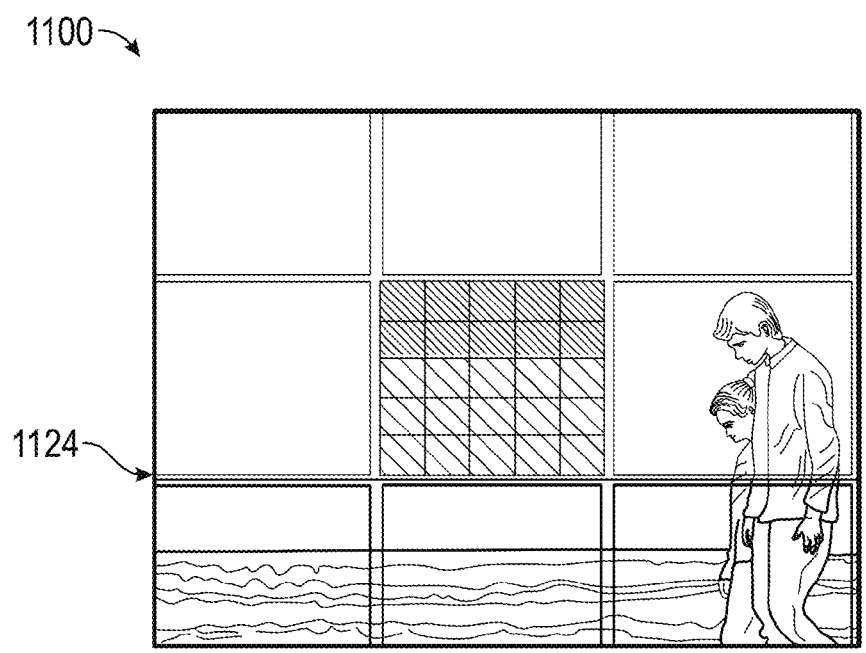
Figure 11F:
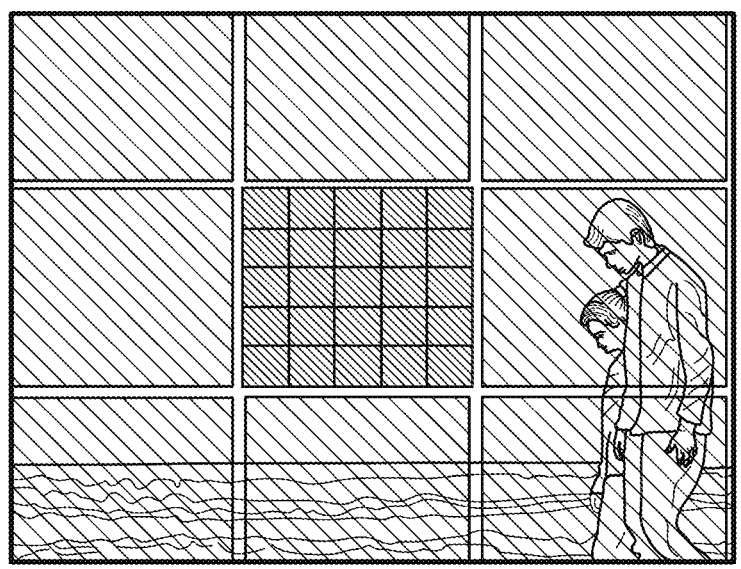

FIGS. 11D-11F illustrate another example of incremental PDAF processing, in accordance with some embodiments. As illustrated in FIGS. 11D-11F, the image frame 1100 is divided into a central portion 1102 and eight surrounding periphery regions (similar to the image frame 800 as illustrated in FIG. 8C).

FIG. 11D illustrates a first interrupt at a point 1122 when approximately half of the image frame 1100 has been stored in the buffer and ready for processing, as indicated by the portions with diagonal lines of the image frame 1100 of FIG. 11D. As such, the software library PDLIB may be called to perform PDAF processing on the windows of the received portion of the central portion 1102 of the image frame 1100 (e.g., the first two rows of windows within the central portion 1102) as the image frame data continues to be received.

As illustrated in FIG. 11E, a second interrupt may occur at a point 1124 when the entirety of the central portion 1102 of the image frame 1100 has been received. As such, PDLIB may be called to perform PDAF processing on the remaining portion of the central portion 1102, e.g., the third, fourth, and fifth rows of windows within the central portion 1102, as indicated by the diagonal lines with smaller density.

As illustrated in FIG. 11F, the entire image frame 1100 has been received. At this point, processing of the central portion 1102 of the image frame 1100 may have concluded, as indicated by all of the portions of the central portion 1102 having high-density diagonal lines, as opposed to the remaining portion of the image frame 1100 of FIG. 11F (e.g., the portions with low-density diagonal lines).

In another example scenario, a foreground object may be detected in the central portion 1102 and/or a confidence level may be met or exceed a threshold level, as described above. Such a scenario would be unlikely in the example illustrated in FIG. 11F, since there is no foreground object in the central portion 1102. Nonetheless, a scenario in which a foreground object is detected in the central portion 1102 and/or a confidence level meets or exceeds a threshold level would allow for the phase detection AF camera 315 to position the lens 150 at an appropriate position immediately in preparation for receiving a next image frame. This would allow the phase detection AF camera 315 to proceed without having to wait for additional processing, allowing for the autofocus function of the camera 315 to be more responsive.

Further in this example scenario, because PDAF processing of the central portion 1102 of the image frame 1100 may be concluded by the time the entire image frame 1100 has been received and stored in the buffer, PDAF processing of any periphery regions (e.g., those outside of the central portion 1102) of the image frame 1100 may begin immediately (e.g., in response to a determined confidence level of the PDAF performed on the central portion 1102 not meeting a threshold value). For example, in some embodiments, PDAF processing of the periphery regions of the image frame 1100 may begin after point 1124 of FIG. 11E when the entirety of the central portion 1102 has been received and is able to be processed.

It is understood that in other embodiments any number of interrupts may be implemented. For example, in another embodiment, a first interrupt may occur at a point where all of the central portion 1102 of the image frame 1100 has been received, and a second interrupt when the entire image frame 1100 has been received.

As described above, during incremental processing, PDLIB may be called multiple times. In some embodiments, the buffer may maintain a "Ready" flag indicating whether the PDLIB is ready to be called. The "Ready" flag in the buffer may be updated each time PDLIB is called. Upon processing an available portion of the image frame, the PDLIB may return to the buffer an indication of whether it will need to be called again for the particular image frame (e.g., an indication of whether all windows of the central portion of the image frame have been processed).

Implementations disclosed herein provide systems, methods and apparatus for mask-less phase detection autofocus. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, one or more image signal processors, and a memory including instructions or modules for carrying out the process discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

In the above description, reference numbers may have been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples. Thus, the present invention is not intended to be limited to the implementations shown herein but is to be accorded the widest scope consistent with the principles and novel features disclosed herein.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) signal or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a sensor portion 100 (as described in connection with FIG. 1), any or all of the components of an image capture device 300 (as described in connection with FIG. 3), and/or another device as applicable. For example, such a device can be coupled to a server to facilitate the transfer of means for performing the methods described herein. In some aspects, the means for capturing may comprise the sensor portion 100 and/or any or all of the components of the image capture device 300. In some aspects, the means for storing may comprise the working memory 305, the storage 310, and/or any or all of the components of the image capture device 300. In some aspects, the means for receiving, storing, receiving and storing, dividing, identifying, determining, setting, retrieving, performing, moving, and otherwise, may comprise the image signal processor 320 and/or any or all of the components of the image capture device 300. Alternatively, various methods described herein can be provided via storage means (e.g., RAM, ROM, a physical storage medium such as a compact disc (CD) or floppy disk, etc.), such that a device (e.g., a camera) can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

The phrase "based on" does not mean "based only on," unless expressly specified otherwise. In other words, the phrase "based on" describes both "based only on" and "based at least on."

While the foregoing is directed to aspects of the present disclosure, other and further aspects of the disclosure may be devised without departing from the basic scope thereof, and the scope thereof is determined by the claims that follow.

What is claimed is:

1. An apparatus, comprising:
    an image sensor configured to capture image data of a scene;
    a memory comprising a buffer; and
    at least one processor coupled to the image sensor and the memory, the at least one processor configured to:
        receive and store the image data captured by the image sensor in the buffer as a current frame of the scene;
        divide the current frame of the scene into a plurality of windows, each of the plurality of windows corresponding to a different spatial region of the scene;
        identify a central portion of the current frame, the central portion comprising a subset of the plurality of windows;
        determine a first depth value of the central portion based on performing phase detection autofocus (PDAF) on the subset of the plurality of windows; and
        determine a confidence value for the central portion based on the first depth value and image data corresponding to the subset of the plurality of windows.

2. The apparatus of claim 1, wherein the at least one processor is further configured to set a lens position according to the first depth value in response to the confidence value meeting or exceeding a threshold value.

3. The apparatus of claim 2, wherein the at least one processor is further configured to:
    receive an indication of a location within the scene that is outside the central portion of the scene, wherein the indication comprises one of a user touch at the location and a face detection at the location;
    identify at least one window of the plurality of windows closest to the location;
    retrieve, from the buffer, image data of the current frame of the scene corresponding to the identified at least one window;
    perform PDAF on the identified at least one window, wherein performing PDAF on the identified at least one window includes determining a second depth value associated with the identified at least one window; and
    set the lens position according to the second depth value.

4. The apparatus of claim 1, wherein the at least one processor is further configured to:
    determine, based on the first depth value, a distance between a current position for a lens of the apparatus and a focus position for the lens; and
    move the lens from the current position to the focus position based on the distance.

5. The apparatus of claim 1, wherein the buffer comprises a double buffer storing the current frame of the scene and a previous frame of the scene.

6. The apparatus of claim 1, wherein the at least one processor is further configured to perform PDAF on at least one window of the plurality of windows that corresponds to a location outside the central portion in response to the confidence value being less than the threshold value.

7. The apparatus of claim 6, wherein the at least one processor is further configured to:
    identify one or more peripheral regions, each of the one or more peripheral regions corresponding to a spatial region outside the central portion of the scene; and
    perform PDAF on at least one of the one or more peripheral regions.

8. The apparatus of claim 7, wherein the at least one processor is further configured to perform the PDAF on the one or more peripheral regions based on a sparser sampling of image data in comparison with the PDAF performed on the subset of the plurality of windows.

9. The apparatus of claim 1, wherein the at least one processor is further configured to:
    determine a confidence level for each of the plurality of windows corresponding to the central portion of the scene, wherein determining the confidence value for the central portion is based on each of the determined confidence levels; and
    determine whether any of the determined confidence levels exceed the threshold value.

10. A method, comprising:
    capturing, at an image sensor, image data of a scene;
    receiving and storing the image data, at a buffer, as a current frame of the scene;
    dividing the current frame of the scene into a plurality of windows, each of the plurality of windows corresponding to a different spatial region of the scene;
    identifying a central portion of the current frame, the central portion comprising a subset of the plurality of windows;
    determining a first depth value of the central portion based on performing phase detection autofocus (PDAF) on the subset of the plurality of windows; and determining a confidence value for the central portion based on the first depth value and image data corresponding to the subset of the plurality of windows.

11. The method of claim 10, further comprising setting a lens position according to the first depth value in response to the confidence value meeting or exceeding a threshold value.

12. The method of claim 11, further comprising:
receiving an indication of a location within the scene that is outside the central portion of the scene, wherein the indication comprises one of a user touch at the location and a face detection at the location;
identifying at least one window of the plurality of windows closest to the location;
retrieving, from the buffer, image data of the current frame of the scene corresponding to the identified at least one window;
performing PDAF on the identified at least one window, wherein performing PDAF on the identified at least one window includes determining a second depth value associated with the identified at least one window; and
setting the lens position according to the second depth value.

13. The method of claim 10, further comprising:
determining, based on the first depth value, a distance between a current position for a lens of the apparatus and a focus position for the lens; and
moving the lens from the current position to the focus position based on the distance.

14. The method of claim 10, wherein the buffer comprises a double buffer storing the current frame of the scene and a previous frame of the scene.

15. The method of claim 10, further comprising performing PDAF on at least one window of the plurality of windows that corresponds to a location outside the central portion in response to the confidence value being less than the threshold value.

16. The method of claim 15, further comprising:
identifying one or more peripheral regions, each of the one or more peripheral regions corresponding to a spatial region outside the central portion of the scene; and
performing PDAF on at least one of the one or more peripheral regions.

17. The method of claim 16, further comprising performing the PDAF on the one or more peripheral regions based on a sparser sampling of image data in comparison with the PDAF performed on the subset of the plurality of windows.

18. The method of claim 10, further comprising:
determining a confidence level for each of the plurality of windows corresponding to the central portion of the scene, wherein determining the confidence value for the central portion is based on each of the determined confidence levels; and
determining whether any of the determined confidence levels exceed the threshold value.

19. An apparatus, comprising:
means for capturing image data of a scene;
means for receiving and storing the image data as a current frame of the scene;
means for dividing the current frame of the scene into a plurality of windows, each of the plurality of windows corresponding to a different spatial region of the scene;
means for identifying a central portion of the current frame, the central portion comprising a subset of the plurality of windows;
means for determining a first depth value of the central portion based on performing phase detection autofocus (PDAF) on the subset of the plurality of windows; and
means for determining a confidence value for the central portion based on the first depth value and image data corresponding to the subset of the plurality of windows.

20. The apparatus of claim 19, further comprising means for setting a lens position according to the first depth value in response to the confidence value meeting or exceeding a threshold value.

21. The apparatus of claim 20, further comprising:
means for receiving an indication of a location within the scene that is outside the central portion of the scene, wherein the indication comprises one of a user touch at the location and a face detection at the location;
means for identifying at least one window of the plurality of windows closest to the location;
means for retrieving image data of the current frame of the scene corresponding to the identified at least one window;
means for performing PDAF on the identified at least one window, wherein performing PDAF on the identified at least one window includes determining a second depth value associated with the identified at least one window; and
means for setting the lens position according to the second depth value.

22. The apparatus of claim 19, further comprising:
means for determining, based on the first depth value, a distance between a current position for a lens of the apparatus and a focus position for the lens; and
means for moving the lens from the current position to the focus position based on the distance.

23. The apparatus of claim 19, wherein the buffer comprises a double buffer storing the current frame of the scene and a previous frame of the scene.

24. The apparatus of claim 19, further comprising means for performing PDAF on at least one window of the plurality of windows that corresponds to a location outside the central portion in response to the confidence value being less than the threshold value.

25. The apparatus of claim 24, further comprising:
means for identifying one or more peripheral regions, each of the one or more peripheral regions corresponding to a spatial region outside the central portion of the scene; and
means for performing PDAF on at least one of the one or more peripheral regions.

26. The apparatus of claim 25, further comprising means for performing the PDAF on the one or more peripheral regions based on a sparser sampling of image data in comparison with the PDAF performed on the subset of the plurality of windows.

27. The apparatus of claim 19, further comprising:
means for determining a confidence level for each of the plurality of windows corresponding to the central portion of the scene, wherein determining the confidence value for the central portion is based on each of the determined confidence levels; and
means for determining whether any of the determined confidence levels exceed the threshold value.

* * * * *